(12) United States Patent
Jaime et al.

(10) Patent No.: US 12,460,516 B1
(45) Date of Patent: Nov. 4, 2025

(54) SYSTEM, APPARATUS, AND METHOD FOR LOUVER PERFORATION

(71) Applicant: Roscoe Moss Manufacturing Company, Los Angeles, CA (US)

(72) Inventors: Oscar M. Jaime, Los Angeles, CA (US); Craig Logan, Los Angeles, CA (US)

(73) Assignee: ROSCOE MOSS MANUFACTURING COMPANY, Los Angeles, CA (US)

( * ) Notice: Subject to any disclaimer, the term of this patent is extended or adjusted under 35 U.S.C. 154(b) by 477 days.

(21) Appl. No.: 17/545,359

(22) Filed: Dec. 8, 2021

Related U.S. Application Data

(60) Provisional application No. 63/123,363, filed on Dec. 9, 2020.

(51) Int. Cl.
| | |
|---|---|
| *B26F 1/14* | (2006.01) |
| *B21D 28/28* | (2006.01) |
| *B23P 13/00* | (2006.01) |
| *B23P 15/00* | (2006.01) |
| *E02D 5/54* | (2006.01) |
| *E21B 43/112* | (2006.01) |

(52) U.S. Cl.
CPC ............ *E21B 43/112* (2013.01); *B21D 28/28* (2013.01); *B23P 13/00* (2013.01); *B23P 15/00* (2013.01); *E02D 5/54* (2013.01); *Y10T 83/386* (2015.04)

(58) Field of Classification Search
CPC ........ B26D 3/161; B26D 31/164; B26D 3/00; B26D 5/00; B23D 21/14; B26B 21/00; B26F 1/0061; B26F 1/14; B26F 1/0038; B21D 28/285; F16L 41/04; E03B 3/12; E02D 9/005; E02D 9/04; Y10T 83/0467; Y10T 83/0596; Y10T 83/0448; Y10T 83/16983; Y10T 83/16016; Y10T 83/16967; Y10T 83/0538; Y10T 83/396
USPC ......... 83/27, 23, 54, 189, 42, 183, 196, 401, 83/178–182, 184–188, 190–195, 36
See application file for complete search history.

(56) References Cited

U.S. PATENT DOCUMENTS 2,484,854 A * 10/1949 Peters .................... B23D 25/04
384/321
2,749,983 A * 6/1956 Rogers ................... B23D 21/14
83/185

(Continued)

FOREIGN PATENT DOCUMENTS

WO    WO-9929447 A1 * 6/1999 ........... B21C 37/127

*Primary Examiner* — Ghassem Alie
(74) *Attorney, Agent, or Firm* — Snell & Wilmer LLP

(57) ABSTRACT

Systems, methods, and devices for perforating louver perforations into a pipe are contemplated. Systems, methods, and devices for transporting pipes for perforation are contemplated. Systems, methods, and devices for performing quality control inspections of such perforations contemplated. A pipe may be oriented vertically and raised over a device that punches perforations into the pipe from the inside of the pipe toward the outside of the pipe. Various supports may contact the pipe for stabilization and to facilitate the formation of perforations without removing cut away pieces from the pipe. Electronic monitoring of the features of the pipe facilitate quality control inspection during processing. In this manner, a structurally robust pipe having a series of louver perforations along the pipe may be formed.

13 Claims, 30 Drawing Sheets

(56) References Cited

U.S. PATENT DOCUMENTS

| | | | | |
|---|---|---|---|---|
| 3,259,003 | A | * | 7/1966 | Griffin ................. B21D 28/285 83/191 |
| 3,791,243 | A | * | 2/1974 | Holinski ................ B23D 21/14 83/180 |
| 3,823,883 | A | * | 7/1974 | Fencl ........................ F16L 9/04 242/444 |
| 4,205,545 | A | * | 6/1980 | Andrews ................ B21D 28/28 29/896.6 |
| 5,020,351 | A | * | 6/1991 | Castricum ............. B21C 37/127 72/70 |
| 5,193,374 | A | * | 3/1993 | Castricum ................ B26D 1/60 72/132 |
| 5,257,521 | A | * | 11/1993 | Castricum ............. B21C 37/127 72/131 |
| 5,899,131 | A | * | 5/1999 | Benkert ................ F16C 33/543 83/191 |
| 7,017,461 | B2 | * | 3/2006 | Estes ......................... B26F 1/22 83/13 |
| 2004/0074359 | A1 | * | 4/2004 | Binggeli ................ B23D 21/14 83/673 |
| 2004/0226421 | A1 | * | 11/2004 | Kelley .................... B23D 21/02 83/668 |
| 2011/0290091 | A1 | * | 12/2011 | Clark, II ................. E02D 9/005 83/184 |

* cited by examiner

Perforator #7
System RUNNING
Perforator AUTO

- Home
- Pipe Info
- Evaluation
- Slot Opening
- Robot
- Camera
- Security
- Alarms Broken Blade Evaluation   *Note: this is material thickness + slot opening Camera readings will be considered acceptable
between  0.285  in  and  0.505  in
adjustment  -0.015           0.125

Low Boundary Adjustments for End Readings
                edges  0    x  0.28 ...  0.000  in
1 reading in from edges  0.5  x  0.28 ...  0.143  in Consecutive Triggers until Alarm   12

Louver Slot Opening Evaluation between  0.065  in  and  0.095  in
adjustment  -0.005           0.005

Correction factors
Left            Right
0.025  in       0.030  in

Consecutive Triggers until Alarm   12

1 Alarm

SYSTEM, APPARATUS, AND METHOD FOR LOUVER PERFORATION

CROSS-REFERENCE TO RELATED APPLICATIONS

This application is based upon and claims priority to U.S. provisional patent application 63/123,363 entitled "MACHINES, SYSTEMS AND METHODS FOR LOUVER PERFORATIONS" and filed Dec. 9, 2020, the entire content of which is incorporated herein by reference.

BACKGROUND

1. Field

The present disclosure is directed to a system, apparatus, and method for forming louver perforations in pipes.

2. Description of the Related Art

Presently there exists a need to form perforations in pipes. For instance, water well casings are desired to have perforations that permit the flow of fluid from surrounding geologic features into the pipe while resisting the passage of sediment and debris into the pipe. However, machines and processes to for perforations in pipes frequently diminish the strength of the pipe and cause its deformation. Consequently, there remains a need for systems, apparatuses, and methods for forming perforations in pipes, transporting pipes for perforation, and performing quality control inspection on pipes while retaining the strength and shape of the pipe.

SUMMARY

A louver perforation system is provided. The system may include a mandrel, a first extendible perforator head, a first perforator blade, and a reaction table. The mandrel may be a mandrel configured to be disposed inside a pipe to be perforated. The first extendible perforator head is supported by the mandrel and configured to be disposed inside of the pipe. The first perforator blade is attached to the first extendible perforator head to penetrate through the pipe as the first extendible perforator head extends from the mandrel in a first direction. The reaction table is adjacent to the mandrel and includes a first extendible perforator reaction shoe outside the pipe to support the pipe during the penetrating through the pipe by the first perforator blade.

The louver perforation system may include other aspects. For example, the first extendible perforator reaction shoe and the first extendible perforator head may be extendible toward each other. The first extendible perforator reaction shoe includes a reaction shoe blade having an arcuate reaction face corresponding in shape to the pipe. The first extendible perforator reaction shoe may include a reaction shoe blade having an arcuate reaction face corresponding in shape to the pipe and stabilizing the pipe during the penetrating the pipe by the first perforator blade so that no material is removed from the pipe by the penetrating through the pipe of the first perforator blade.

There may be various arms and stabilizing features as well. For instance, the system may include a plurality of centering roller arms selectably extendible from the reaction table to the pipe, wherein each centering roller arm comprises an arm with a pair of wheels contactable to the pipe to support the pipe. The mandrel may be vertical, and the first extendible perforator head may be extendible in a horizontal plane perpendicular to the vertical mandrel, whereby the pipe is at least partially stabilized by gravity. The mandrel may include a pipe alignment flange that is a disc disposed at an end of the mandrel and inside the pipe to at least one of align the pipe and ameliorate crushing of the pipe.

Various features may be duplicated to facilitate an increased processing rate. For instance, a second extendible perforator head may be supported by the mandrel and configured to be disposed inside of the pipe. A second perforator blade may be attached to the second extendible perforator head to penetrate through the pipe as the first extendible perforator head extends from the mandrel in a second direction opposite of and colinear with the first direction. Finally, the reaction table may also include a second extendible perforator reaction shoe outside the pipe to support the pipe during the penetrating through the pipe by the second perforator blade.

The louver perforation system may have a movable pipe carriage. The movable pipe carriage may include a carriage frame that is configured to travel up and down a carriage tower, and a clamping frame attachable to the pipe and attachable to the carriage frame. The clamping frame has a series of indexing apertures configured to receive a pin to orient the pipe in a series of rotational orientations relative to the first perforator blade. Moreover, the mandrel may extend vertically upward from a subterranean pit and toward the reaction table. A pipe transportation system may connect to the pipe to selectably raise the pipe from a pit and passing over the mandrel, whereby the first perforator blade attached to the first extendible perforator head is configured to form penetrations through the pipe at multiple positions along at least a portion of a length of the pipe.

The perforator blades may include features. For instance, the first perforator blade may include a shearing face and a ramping face. The shearing face may have an edge to contact and shear through the pipe. The ramping face may be connected at an angle to the edge of the shearing face and may provide a surface to bend the pipe forming a louver without removing material from the pipe.

In further instances, the first perforator blade may include a shearing corner having a curved edge to contact and shear through the pipe, the shearing corner adjacent the shearing face, and a ramping corner, having a curved face connected at an angle to the curved edge of the shearing corner and providing a surface to bend the pipe forming the louver without further tearing of the pipe that has been sheared by the shearing face and shearing corner.

The system may include a movable pipe carriage, as briefly mentioned above. The movable pipe carriage may have a variety of features. For instance, the system may have a movable pipe carriage having a carriage frame that is configured to travel up and down a carriage tower and a clamping frame attachable to the pipe and attachable to the carriage frame, wherein the camping frame orients the pipe relative to the first perforator blade. The movable pipe carriage may further include a pipe spindle extending from the clamping frame and rotatably connected to the carriage frame so that the pipe attachable to the clamping frame is rotatable relative to the mandrel.

A method of louver perforation is also provided. The method may have multiple aspects that may be performed in various sequences. For instance, the method may include disposing a mandrel inside of a pipe, wherein the mandrel has a first extendible perforator head supported by the mandrel and inside of the pipe. The method may include indexing the pipe upward, by moving a movable pipe carriage attached to the pipe, to a longitudinal location of a last perforation to be perforated, wherein the first extendible perforator head is aligned with the longitudinal location of the last perforation to be perforated. The method may include electronically marking the longitudinal location of the last perforation in a computer memory. The method may include also (and without making the last perforation in the pipe), subsequently indexing the pipe downward, by the moveable pipe carriage, to a longitudinal location of a first perforation to be perforated, wherein the first extendible perforator head is aligned with the longitudinal location of the first perforation to be perforated. The method may include electronically marking the longitudinal location of the first perforation in the computer memory, indexing the pipe to a circumferential location of the first perforation and the last perforation by rotating a carriage frame connecting the pipe to the movable pipe carriage, and extending a plurality of centering roller arms to contact the pipe. The method may contemplate extending an extendible perforator reaction shoe to contact an outside of the pipe, cycling the first extendible perforator head toward and away from the pipe to cause a perforator blade carried by the first extendible perforator head to perforate the pipe at the longitudinal location and circumferential location of the first perforation, retracting the extendible perforator reaction shoe, and indexing the pipe a first distance toward the longitudinal location of the last perforation. The method may continue with repeating the cycling of the first extendible perforator head and repeating the indexing the pipe the first distance until the last perforation is formed by the first extendible perforator head at the longitudinal location of the last perforation.

A further method of louver perforation is also contemplated. The method may include disposing a mandrel inside of a pipe, wherein the mandrel has a first extendible perforator head supported by the mandrel and inside of the pipe, extending the first perforator head toward the pipe from inside of the pipe in a first direction, wherein a first perforator blade attached to the first extendible perforator head penetrates through the pipe, and extending a first extendible perforator reaction shoe outside the pipe from a reaction table adjacent to the mandrel and toward the pipe. The method may include contacting the first extendible perforator reaction shoe to the pipe to support the pipe during the penetrating the pipe by the first perforator blade.

In various embodiments, the method has additional aspects. For instance, the method may include extending a plurality of centering roller arms from the reaction table toward the pipe to contact the pipe, wherein each centering roller arm comprises an arm with a pair of wheels contactable to the pipe to support the pipe.

Moreover, in various instances the mandrel has a second extendible perforator head supported by the mandrel and inside of the pipe and the method further includes aspects relating to the second extendible perforator head. For instance, the method may include extending the second perforator head toward the pipe from inside of the pipe in a second direction opposite of and colinear with the first direction, wherein a second perforator blade attached to the second extendible perforator head penetrates through the pipe. The method may include extending a second extendible perforator reaction shoe outside the pipe from the reaction table adjacent to the mandrel and toward the pipe. The method may include contacting the second extendible perforator reaction shoe to the pipe to support the pipe during the penetrating the pipe by the second perforator blade.

Continuing the discussion of a method of louver perforation, further aspects of such a method may be to retract the first perforator head after the extending, so that the first perforator head is entirely inside the pipe. Further aspects may include lifting the pipe vertically over the mandrel in the pipe by raising a movable pipe carriage attached to the pipe in a direction up a carriage tower adjacent to the reaction table, wherein the lifting orients another portion of the pipe for penetrating by the first extendible perforator head.

A method of sizing a perforation formed by a louver perforation system is provided. The louver perforation system may have a first extendible perforator head supported by a mandrel inside a pipe to be perforated and a first perforator blade attached to the first extendible perforator head to penetrate through the pipe as the first extendible perforator head extends from the mandrel in a first direction. The method may include extending the first perforator head to cause the first perforator blade to contact the pipe. The method may include extending the first perforator head further at a first velocity for a first duration of time to form a first perforation in the pipe. A size of the perforation corresponds to a length of the first duration. In various embodiments, the first perforator blade does not remove material from the pipe during the perforating.

In various instances, the method includes increasing a length of the first duration to increase a size of the perforation. In various instances, the method includes decreasing a length of the first duration to decrease a size of the perforation. In various instances, the method includes retracting the perforator head after the passage of at least the first duration of time.

In various instances, the first velocity is a constant velocity. In various instances, the first velocity is an increasing velocity. In various instances, the first velocity is a decreasing velocity. In various instances, the first velocity is a varying velocity.

In various instances, the louver perforation system further includes a first extendible perforator reaction shoe outside the pipe to support the pipe during the first duration as the first perforator blade perforates the pipe. In various instances, the method includes progressively pressing a ramping face of the first reaction blade against the pipe during the first duration, whereby the perforation is progressively enlarged.

A further method is provided for sizing a first perforation and a second perforation formed by a louver perforation system. The louver perforation system may have (i) a first extendible perforator head and a second extendible perforator head, both supported by a mandrel inside a pipe to be perforated and (ii) a first perforator blade attached to the first extendible perforator head to penetrate through the pipe as the first extendible perforator head extends from the mandrel and (iii) a second perforator blade attached to the second extendible perforator head to penetrate through the pipe as the second extendible perforator head extends from the mandrel in a second direction. The method may include extending the first perforator head to cause the first perforator blade to contact the pipe. The method may include extending the second perforator head to cause the second perforator blade to contact the pipe. The method may include extending the first perforator head further at a first velocity for a first duration of time to form a first perforation in the pipe. The method may include extending the second perforator head further at a second velocity for a second duration of time to form a second perforation in the pipe. A size of the first perforation corresponds to a length of the first duration. A size of the second perforation corresponds to a length of the second duration. In various instances, the first perforator blade and the second perforator blade do not remove material from the pipe during the perforating.

In various instances, first duration and the second duration are simultaneous and of a same duration. In various embodiments, the first direction and the second direction are opposite directions. Moreover, the first velocity and the second velocity may be a same velocity. The first velocity and the second velocity may be constant. Increasing a length of the first duration may increase a size of the first perforation.

The method may contemplate retracting the first perforator head after the passage of at least the first duration of time and retracting the second perforator head after the passage of at least the second duration of time. In various instances, the method includes progressively pressing a ramping face of the first reaction blade against the pipe during the first duration, whereby the first perforation is progressively enlarged and simultaneously pressing the ramping face of the second reaction blade against the pipe during the second duration, whereby the second perforation is progressively enlarged, wherein the first duration and the second duration are a same duration.

A pipe transportation system is provided. The pipe transportation system may be configured to transport a pipe to a machine for processing and to transport the pipe away from the machine after processing. The machine may be a louver perforation system and the processing may include forming louvered openings in the pipe. The system may include a carriage tower extending upwardly above the machine to support a movable pipe carriage. The pipe carriage may include a movable carriage frame configured to support a pipe vertically above the machine and raise and lower the pipe to orient to a desired orientation during forming the louvered openings. The system may include a kickout arm having a cantilevered frame movable about an axis of rotation provided by a joint between the kickout arm and the carriage tower, wherein the kickout arm cantilevers away from the carriage tower to push the pipe away from the machine after processing.

In various instances, the pipe carriage further includes a clamping frame having clamping arms that are selectably attachable to the pipe. The pipe carriage may also be selectably attachable to the carriage frame to selectably connect the pipe to the pipe carriage for lifting. The pipe carriage may further include a pipe spindle which provides a shaft connected to the clamping frame and providing a handle for selectably rotating the pipe frame to rotatably position the pipe relative to the machine. In various instances, the clamping frame has a series of indexing apertures configured to receive a pin to orient the pipe in a series of fixable rotational orientations relative to the machine in response to rotating of the pipe spindle.

The system may include a pipe trolley. The pipe trolley may be a wheeled support to permit horizontal movement of a first end of a pipe in response to vertical lifting of a second end of the pipe by the pipe carriage. The system may include a pipe trolley track extending horizontally away from the machine to guide the pipe toward the machine during lifting by the pipe carriage of the pipe. In various instances, the system also has a loading bridge. This may be a cantilevered trough extendable to provide a ramp between the pipe trolley and the pipe carriage for aligning the pipe to the pipe carriage for attachment to the pipe carriage and retractable to provide work space for the forming the louvered openings in the pipe.

A method of transporting a pipe to a louver perforation system for perforation is provided. The method may include lifting a pipe carriage attached to a first end of a pipe up a carriage tower to a partially raised position to lift the first end of the pipe partially up the carriage tower. The method may contemplate receiving a portion of the pipe into a kickout arm of the carriage tower, the kickout arm having a cantilevered frame movable about an axis of rotation provided by a joint between the kickout arm and the carriage tower, wherein the kickout arm cantilevers away from the carriage tower at an angle and supports and guides the pipe during lifting. The method may also include lifting the pipe carriage further up the carriage tower to a fully raised position while supporting and guiding the pipe by the kickout arm for at least a portion of the lifting.

In various instances, the method includes lowering the kickout arm of the carriage tower to orient the pipe vertically above a vertical working mandrel having a blade to punch louvered perforations into the pipe from the inside of the pipe. The method may include lowering the pipe carriage down the carriage tower to a fully lowered position to lower the pipe over the vertical working mandrel so that the vertical working mandrel is disposed inside the pipe and so that the pipe is disposed at least partially inside a pit adjacent the carriage tower. In yet further instances, the method includes attaching a clamping frame to the first end of the pipe and connecting the clamping frame to the pipe carriage to attach the pipe carriage to the first end of the pipe.

A pipe trolley may be included in performance of the method. For instance, the method may include loading the pipe onto a pipe trolley having rolling wheels and rolling the pipe trolley on the rolling wheels to position a first end of the pipe near the pipe carriage prior to the connecting the clamping frame to the pipe carriage. The method may include supporting a second end of the pipe by a pipe trolley, wherein the pipe trolley is a wheeled support to permit horizontal movement of a second end of a pipe in response to vertical lifting of the first end of the pipe by the pipe carriage.

A loading bridge may also be used. The method may include extending a loading bridge having a cantilevered trough extendable to provide a ramp between the pipe trolley and the pipe carriage for aligning the pipe to the pipe carriage before the connecting the clamping frame to the pipe carriage.

A method of transporting a pipe from a louver perforation system after perforation of the pipe by the louver perforation system is provided. The method may include raising a kickout arm of a carriage tower extending above a vertical working mandrel having a blade to punch louvered perforations into the pipe from the inside of the pipe. In response to the raising, the pipe is received into a cantilevered frame of the kickout arm and the kickout arm cantilevers away from the carriage tower at an angle to unalign the pipe with the vertical working mandrel. The method may include lowering a pipe carriage attached to an end of the pipe down the carriage tower to cause the pipe to travel along the kickout arm and away from the carriage tower and toward a pipe trolley.

The method may have additional aspects. For instance, the method may include receiving, by the pipe trolly an end of the pipe, the pipe trolley rollable on a surface to move the end of the pipe away from the vertical working mandrel. The method may include disconnecting the pipe from the pipe carriage by disconnecting from the pipe carriage a clamping frame attached to the pipe and to the pipe carriage. The method may include disconnecting the clamping frame from the pipe after the disconnecting of the clamping frame from the pipe carriage. The method may also include extending a loading bridge that provides a cantilevered trough between the vertical working mandrel and the pipe trolley to guide the pipe traveling along the kickout arm to the pipe trolley.

Further herein, there is provided a method of quality control inspection of louvers formed by a louver perforation system. The method may include receiving data corresponding to a pipe length and a number of perforations to form along the pipe length. The method may include receiving data corresponding to an upper and lower blade size threshold of a louver blade portion of a perforation of the perforations to form along the pipe length. The method may include receiving data corresponding to a maximum count of broken perforations of the perforations to form along the pipe length. The method may include receiving data corresponding to an upper and lower opening size threshold corresponding to an opening portion of the perforation of the perforations to form along the pipe length. The method may include forming, by the louver perforation system, a plurality of perforations along the pipe length. The method may include collecting, by a 3D camera, an image of the perforations of the plurality of perforations during the forming. The method may include processing the image to measure, by a controller, a blade size of the louver blade portion. The method may include process the image to measure, by the controller, an opening size of the opening portion of the perforation. The method may include determining, by the controller, whether the louver blade portion of the perforation is broken and updating a count of broken perforations in response to the determining. The method may include computing a rolling average of at least one of the blade size and the opening size. The method may include displaying, on a display terminal, a graph of the rolling average.

In various instances, additional aspects of the method are provided. The method may include sending an instruction by the controller to the louver perforation system to terminate the forming of the plurality of perforations along the pipe length in response to the blade size of the louver blade portion exceeding at least one of the upper and lower blade size thresholds. The method may include sending an instruction by the controller to the louver perforation system to terminate the forming of the plurality of perforations along the pipe length in response to the count of broken perforations exceeding the maximum count of broken perforations. The method may include resetting the maximum count of broken perforations to zero in response to detecting wherein the louver blade portion of the perforation is not broken.

In further instances, the method includes sending an instruction by the controller to the louver perforation system to terminate the forming of the plurality of perforations along the pipe length in response to the opening size of the opening portion exceeding at least one of the upper and lower opening size thresholds. In still further instances, the method includes sending an instruction by the controller to the louver perforation system to terminate the forming of the plurality of perforations along the pipe length in response to the rolling average of the blade size of the louver blade portion exceeding at least one of the upper and lower blade size thresholds. In yet further instances, the method includes sending an instruction by the controller to the louver perforation system to terminate the forming of the plurality of perforations along the pipe length in response to the rolling average of the opening size of the opening portion exceeding at least one of the upper and lower opening size thresholds.

The receiving data may include various aspects. For instance, the receiving data may include accepting user input on a keyboard. The receiving data may include accepting user input on a touch screen. The receiving data may include retrieving by the controller data from an electronic memory.

A system is provided for electronic quality control inspection of louvers formed by a louver perforation system. The system may include a first robotic arm adjacent a first side of a pipe being perforated by a louver perforation system. The system may include a first 3D camera disposed at an end of the first robotic arm and positioned to view a first perforation in the pipe. The system may include a controller configured to receive data from the first 3D camera and display on a display terminal at least one of an image, graph, or measurement corresponding to the data from the first 3D camera.

In various embodiments, the system also has a second robotic arm adjacent a second side of the pipe being perforated by the louver perforation system, and a second 3D camera disposed at an end of the second robotic arm and positioned to view a second perforation in the pipe. The controller may be further configured to receive data from the second 3D camera and display on the display terminal at least one of an image, graph, or measurement corresponding to the data from the second 3D camera.

In various embodiments, at least one of the first 3D camera and the controller measure a size of a louver blade portion of the first perforation and the controller displays a measurement on the display terminal including the size of the louver blade portion. In various embodiments, at least one of the first 3D camera and the controller measure a size of an opening portion of the first perforation and the controller displays a measurement displayed on the display terminal that is the size of the opening portion of the first perforation. In various embodiments, at least one of the first 3D camera and the controller measure a size of a louver blade portion of the first perforation and the controller updates a rolling average size measurement displayed on the display terminal that is a rolling average of the sizes of multiple louver blade portions. In various embodiments, at least one of the first 3D camera and the controller measure a size of an opening portion of the first perforation and the controller updates a rolling average size measurement displayed on the display terminal including a rolling average of the sizes of multiple opening portions. Furthermore, in various embodiments, at least one of the first 3D camera and the controller measure a distance measurement to a blade portion of the first perforation and the controller displays a false color image of the first perforation on the display terminal having colors corresponding to distances.

A non-transitory computer readable medium is provided. The non-transitory computer readable medium may program instructions for causing a controller to perform methods described herein.

The non-transitory computer readable medium may program instructions for causing a controller to perform a method including various following aspects. For instance, the method may include receiving data corresponding to a pipe length and a number of perforations to form along the pipe length, receiving data corresponding to an upper and lower blade size threshold of a louver blade portion of a perforation of the perforations to form along the pipe length. The method may include receiving data corresponding to a maximum count of broken perforations of the perforations to form along the pipe length. The method may include receiving data corresponding to an upper and lower opening size threshold corresponding to an opening portion of the perforation of the perforations to form along the pipe length. The method may include forming, by the louver perforation system, a plurality of perforations along the pipe length. The method may include collecting, by a 3D camera, an image of the perforations of the plurality of perforations during the forming. The method may include processing the image to measure, by a controller, a blade size of the louver blade portion. The method may include processing the image to measure, by the controller, an opening size of the opening portion of the perforation. The method may include determining, by the controller, whether the louver blade portion of the perforation is broken and updating a count of broken perforations in response to the determining. The method may include computing a rolling average of at least one of the blade size and the opening size. The method may include displaying, on a display terminal, a graph of the rolling average.

The non-transitory computer readable medium may contain further program instructions for causing the controller to perform the method further including sending an instruction by the controller to the louver perforation system to terminate the forming of the plurality of perforations along the pipe length in response to the blade size of the louver blade portion exceeding at least one of the upper and lower blade size thresholds. The non-transitory computer readable medium may contain further program instructions for causing the controller to perform the method further including sending an instruction by the controller to the louver perforation system to terminate the forming of the plurality of perforations along the pipe length in response to the count of broken perforations exceeding the maximum count of broken perforations. The non-transitory computer readable medium may contain further program instructions for causing the controller to perform the method further including resetting the maximum count of broken perforations to zero in response to detecting wherein the louver blade portion of the perforation is not broken.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

FIGS. 18A-G depict views of windows displayed on a display terminal by the quality control system, in accordance with various embodiments;

DETAILED DESCRIPTION

As disclosed herein, systems, apparatuses, and methods are provided to form louver perforations in pipes. Pipes may be formed with perforations for a variety of reasons. For instance, a pipe may be formed with perforations to facilitate the flow of fluid from outside of the pipe into the pipe. Pipes may be formed with perforations to resist a flow of sediment or debris while permitting flow of fluid. Such pipes may be termed "pipe screens." In various instances, the systems herein may be configured to execute methods. The systems may have one or more controllers configured to execute methods responsive to instructions on non-transitory computer readable media.

Pipe screens exist in various slot geometries, of various material types, and with different slot arrangements. One type of pipe screen is a louver screen. A louver screen is a pipe with louvered perforations. For instance, a penetration of the pipe wall may be made, and a portion of the pipe wall may be bent inwardly or outwardly of a circumferential profile of the pipe. The extent to which the portion is bent away from the circumferential profile of the pipe establishes an opening with a predetermined aperture size (e.g. gap) and shape (e.g., aperture profile). This opening of predetermined aperture size and shape may be sized and shaped to allow a certain fluid flow volume, while resisting debris of a certain physical dimension. Moreover, the opening may be contoured to a predetermined aperture shape according to fluid dynamical principles to facilitate desired flow behavior. For instance, a contoured louver with gradual bends facilitates increased laminar flow and diminishes turbulence or other fluid behaviors that may decrease the rate of flow of the fluid. In various instances, such as agricultural wells, consistent high volume flow is desired, thus turbulence and other transient behaviors are desired to be diminished.

Moreover, a louvered perforation has a corrugating effect on the pipe, enhancing pipe strength, whereas punched apertures that remove material from the pipe have a weakening effect. Consequently, for reasons of hydraulic fluid flow properties, for reasons of pipe strength, and for reasons of screening unwanted debris, louver perforations are desired to be formed in pipes.

Prior efforts for forming louvered openings in pipes exhibit various disadvantages. For instance, prior efforts include forming louvered openings in a flat sheet of material which is then rolled and welded in a pipe shape. However, shape distortions arise during the rolling and welding process, and such processes damage formed louvers, impeding screening of unwanted debris by the louver as the louver size is altered, damage the pipe causing it to assume non-round shapes and consequently diminished strength, and harm the hydraulic fluid flow properties of the louver penetrations by introducing local irregularities.

Louver Perforation System

Figure 1:
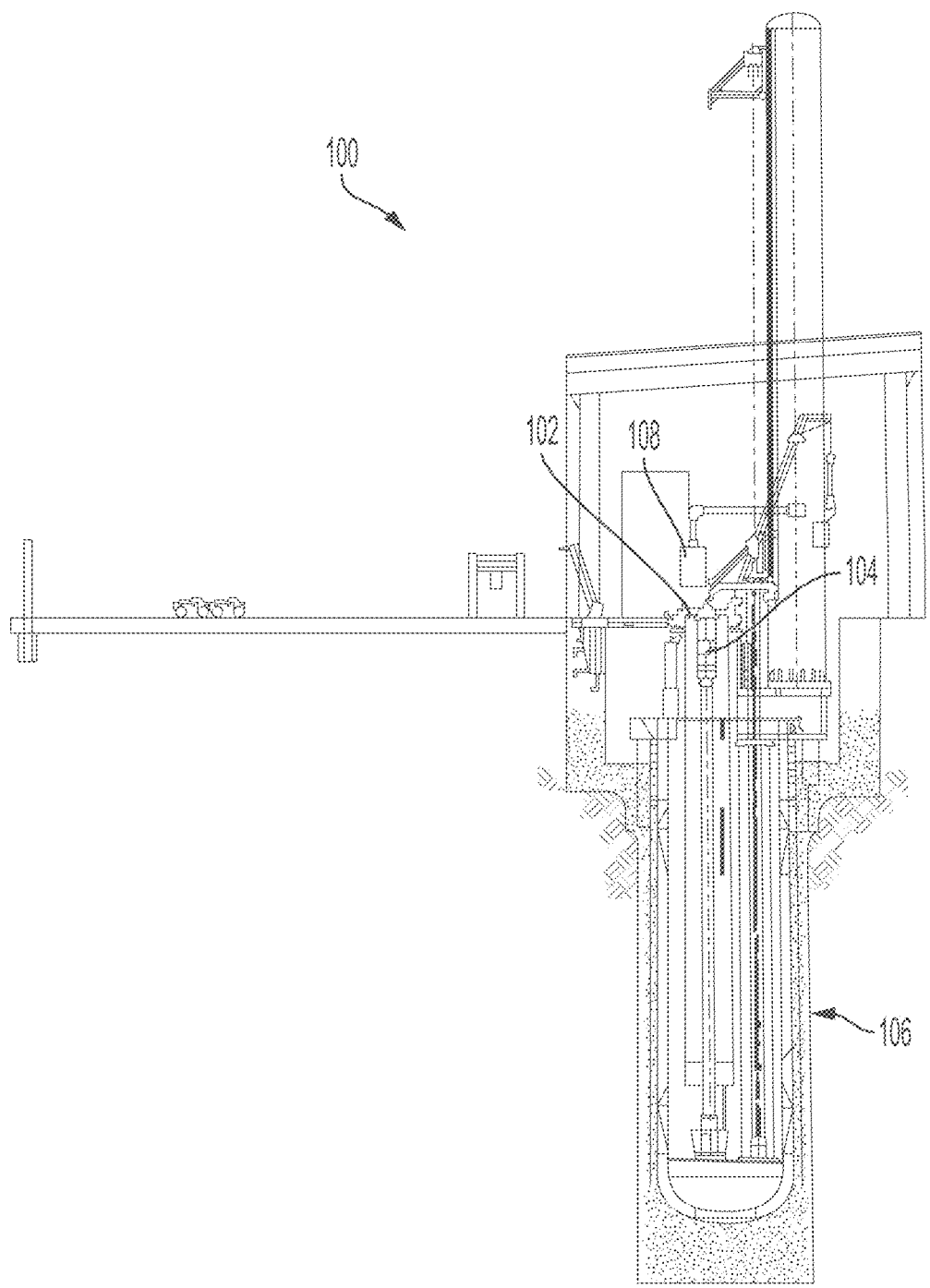
FIG. 1 depicts a louver perforation system, in accordance with various embodiments.

Directing attention to FIG. 1, a louver perforation system 100 is depicted. A louver perforation system 100 as disclosed herein advantageously may form louvers in a pipe that is already formed into a cylindrical shape. The louver perforation system 100 may further form louvers in a pipe while oriented vertically relative to gravity, thereby exploiting the weight of the pipe to index the pipe to a proper location and stabilize the pipe, increasing the accuracy and precision of locating and forming the louvers in the pipe. As such, a finished pipe having a known final diameter and length may be selected, and louvers formed therein. The pipe screen thus adheres to a pipe specification, and weld seam qualifications, as a reforming process is not necessary after louver perforation (unlike when working with a flat sheet that is later formed into a pipe). Exploiting the weight of the pipe by forming louvers with the pipe oriented vertically enhances consistent size and spacing of louver perforations, straighter rows of louvers, axial indexing. Forming louvers with a vertically oriented pipe further diminishes subsequent crushing of earlier formed louvers during formation of later formed louvers because the pipe does not rest on its side during louver formation. Yet furthermore, lengthier sections of pipe may be processed, and louvers may be arranged in arbitrary patterns to satisfy different specifications.

A louver perforation system 100 may include a reaction table assembly 102. The reaction table assembly 102 is an arrangement of components positioned to be outside of a pipe in which perforations are being formed. Perforations are formed by components disposed inside the pipe which press against the pipe, causing an opening to form in the pipe from the inside toward the outside of the pipe. Consequently, the reaction table assembly 102 comprises an arrangement of components to provide a corresponding reaction force during the formation of a perforation, stabilizing the pipe and ameliorating undesirable deformations.

A louver perforation system 100 may include a perforator mandrel assembly 104. The perforator mandrel assembly 104 comprises an arrangement of components positioned to be inside of the pipe in which perforations are being formed. The perforator mandrel assembly 104 includes the components disposed inside the pipe which press against the pipe causing the opening to form in the pipe from the inside toward the outside of the pipe. The reaction table assembly 102 may be disposed generally around the perforator mandrel assembly 104, with the perforator mandrel assembly 104 generally surrounded in a horizontal plane by the aspects of the reaction table assembly 102. The perforator mandrel assembly 104 may also extend significantly in a vertical direction. For instance, the perforator mandrel assembly 104 may be disposed inside a length of the pipe in which perforations are being formed.

The louver perforation system 100 may include a working pit 106. Due to the length of pipes being processed, a working pit 106 may comprise an arrangement of components positioned to be below the reaction table assembly 102. Moreover, the perforator mandrel assembly 104 may also extend into the working pit 106. In various embodiments, the working pit 106 defines a framed bore formed downwardly into the ground. A pipe may be lowered into the working pit 106 and over the perforator mandrel assembly 104. The pipe may be incrementally raised out of the working pit 106 and passing through a plane of the reaction table assembly 102. Louver perforations may be formed in the pipe by components of the perforator mandrel assembly 104 and the reaction table assembly 102 working in cooperation. The pipe may be incrementally raised out of the working pit 106 to locate the perforations in a desired location on the pipe.

Figure 17A:
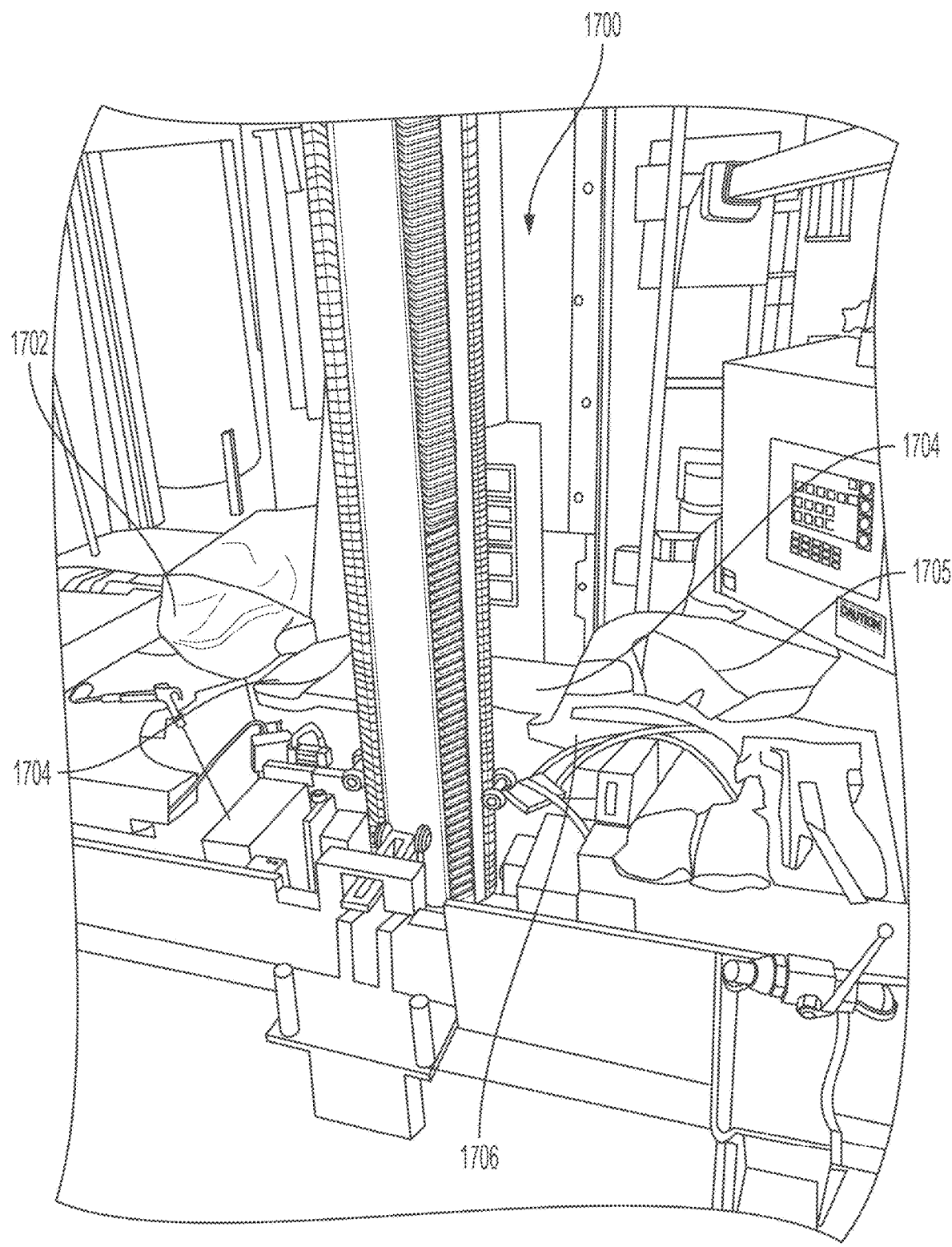
FIGS. 17A-B depict views of a quality control system, in accordance with various embodiments.
Figure 17B:
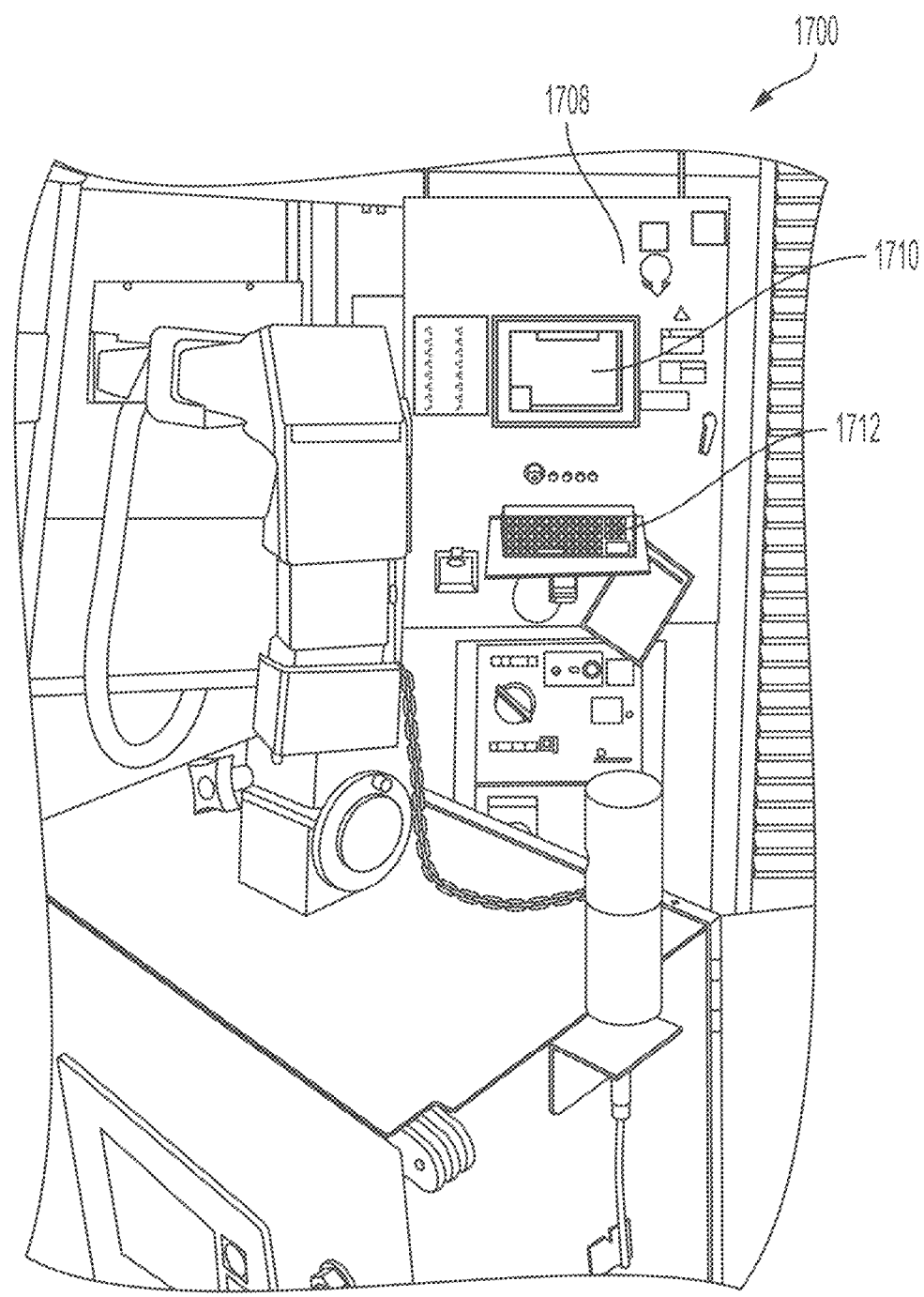

The louver perforation system 100 may include a human-machine interface 108. The human-machine interface 108 may comprise a computer with a processor and a memory. The human-machine interface 108 may have a screen, keyboard, or other input or output device. Various motors and hydraulic pumps that cause aspects of the louver perforation system 100 to move and operate may be controlled and monitored from the human-machine interface 108. Moreover, various sensors may monitor the formation of louver perforations and data from the sensors may be presented on the human-machine interface 108 to facilitate quality control. Aspects of a quality control system 1700 (FIGS. 17A-B) that operates with the louver perforation system 100 will be discussed separately herein, though periodic reference may be made to clarify aspects of the louver perforation system 100. Thus, one may appreciate that the human-machine interface 108 may be a logical aspect of elements of the quality control system 1700 (FIGS. 17A-B), such as the controller 1708 (FIGS. 17A-B), display terminal 1710 (FIGS. 17A-B), and input device 1712 (FIGS. 17A-B), though in further instances, the human-machine interface 108 may be separate from and not shared with the quality control system 1700 (FIGS. 17A-B).

Figure 11:
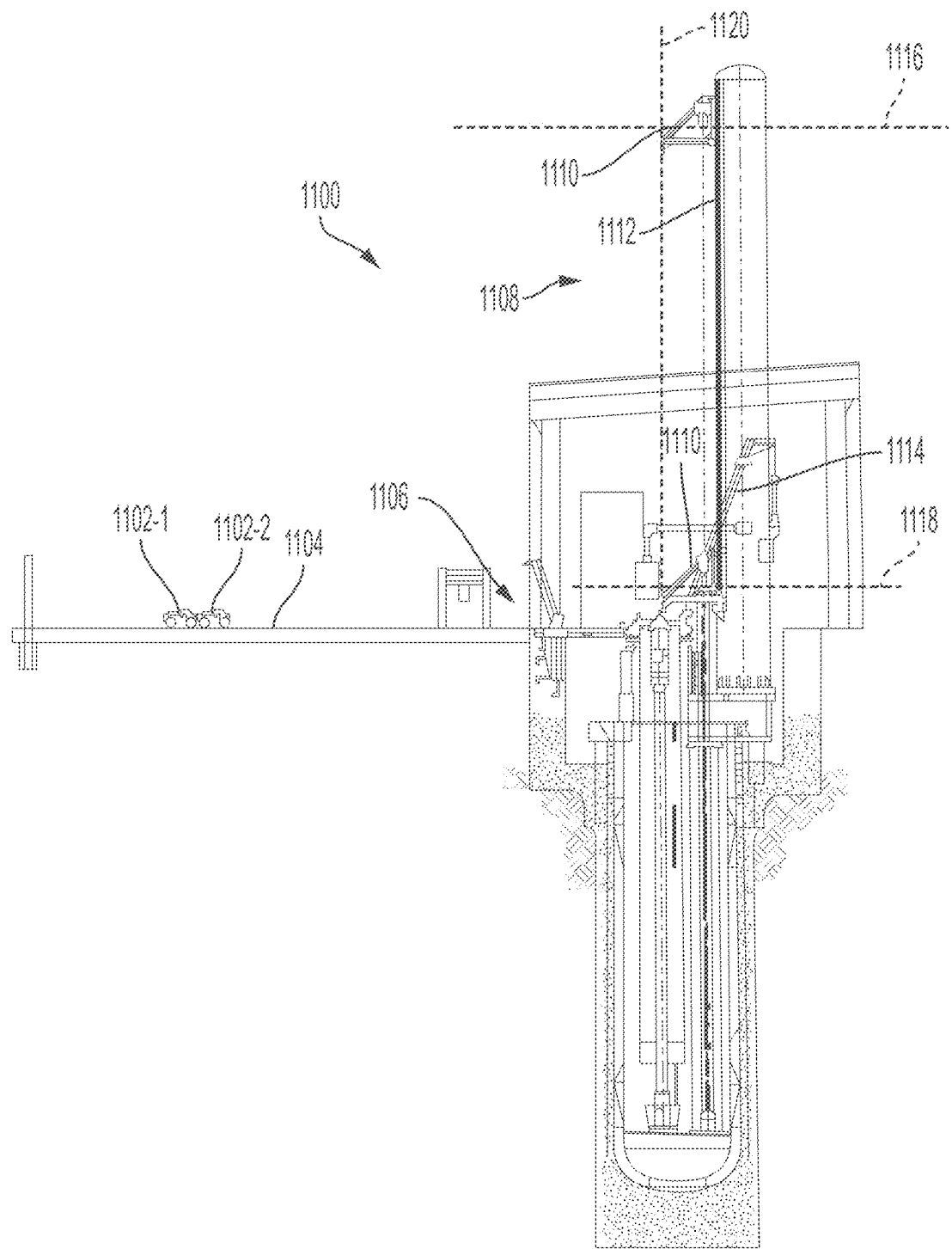
FIG. 11 depicts a pipe transportation system, in accordance with various embodiments.

In addition to a louver perforation system 100, the louver perforation system 100 may cooperate with a pipe transportation system 1100 (see FIG. 11). The pipe transportation system 1100 may facilitate the placement of a pipe in a desired relation to the louver perforation system 100, the movement of the pipe during processing by the louver perforation system 100, and the removal of the pipe from the louver perforation system 100 after processing. The pipe transportation system 1100 (FIG. 11) will be discussed separately herein, though periodic reference may be made to clarify aspects of the louver perforation system 100.

Figure 2:
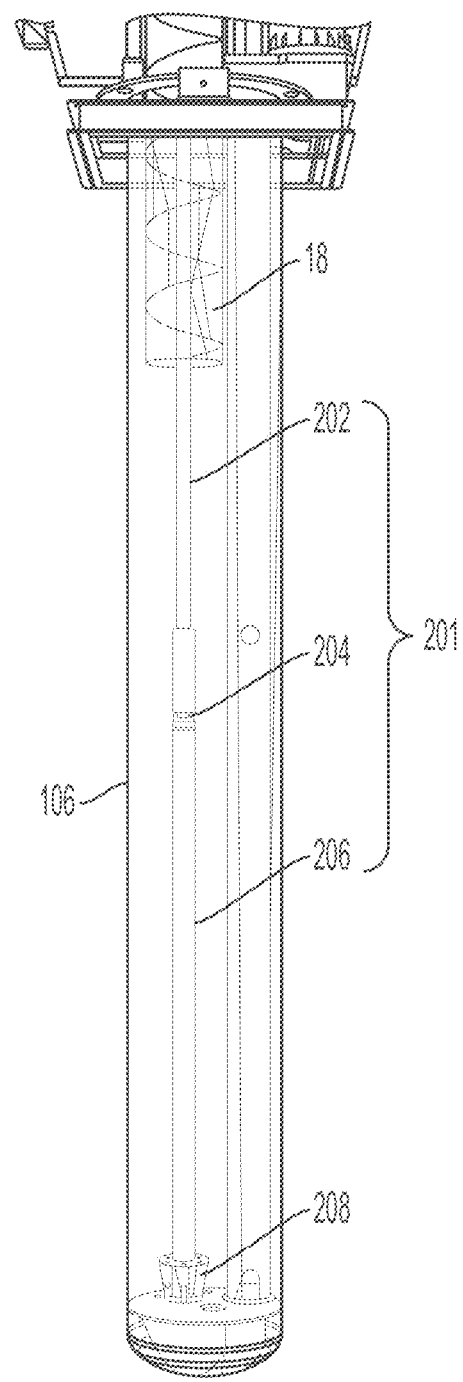
FIG. 2 depicts a working pit of the louver perforation system, in accordance with various embodiments.

Turning now to FIG. 2, the louver perforation system 100 includes the working pit 106. The working pit 106 may include a vertical working mandrel 201. The vertical working mandrel 201 may extend upwardly from a base of the working pit 106 to support aspects of the louver perforation system 100 inside of a pipe. The vertical working mandrel 201 may comprise a vertically extending shaft having a diameter smaller than a pipe being processed. The vertical working mandrel 201 may be attached to a lower mandrel pipe stand 208 in the base of the working pit 106. The lower mandrel pipe stand 208 comprises a fixture supporting the vertical working mandrel 201 in vertical orientation extending upwardly. The vertical working mandrel 201 may support the perforator mandrel assembly 104 (see FIGS. 1, 3) in a desired orientation relative to the reaction table assembly 102 (see FIGS. 1, 3).

The vertical working mandrel 201 may have different components. For instance, the vertical working mandrel 201 may comprise sections. An upper mandrel shaft 202 may be joined to a lower mandrel shaft 206 at a mandrel shaft coupling 204. The lower mandrel shaft 206 may comprise a vertically extending shaft attached to the lower mandrel pipe stand 208. The upper mandrel shaft 202 may comprise a vertically extending shaft attached to an end of the lower mandrel shaft 206 opposite the lower mandrel pipe stand 208. The attachment of upper mandrel shaft 202 and the lower mandrel shaft 206 may be by a mandrel shaft coupling 204. The mandrel shaft coupling 204 may comprise a bolt or pin passing through corresponding apertures in the upper mandrel shaft 202 and lower mandrel shaft 206, or may comprise a weld, or may comprise another fixation as desired.

Figure 3:
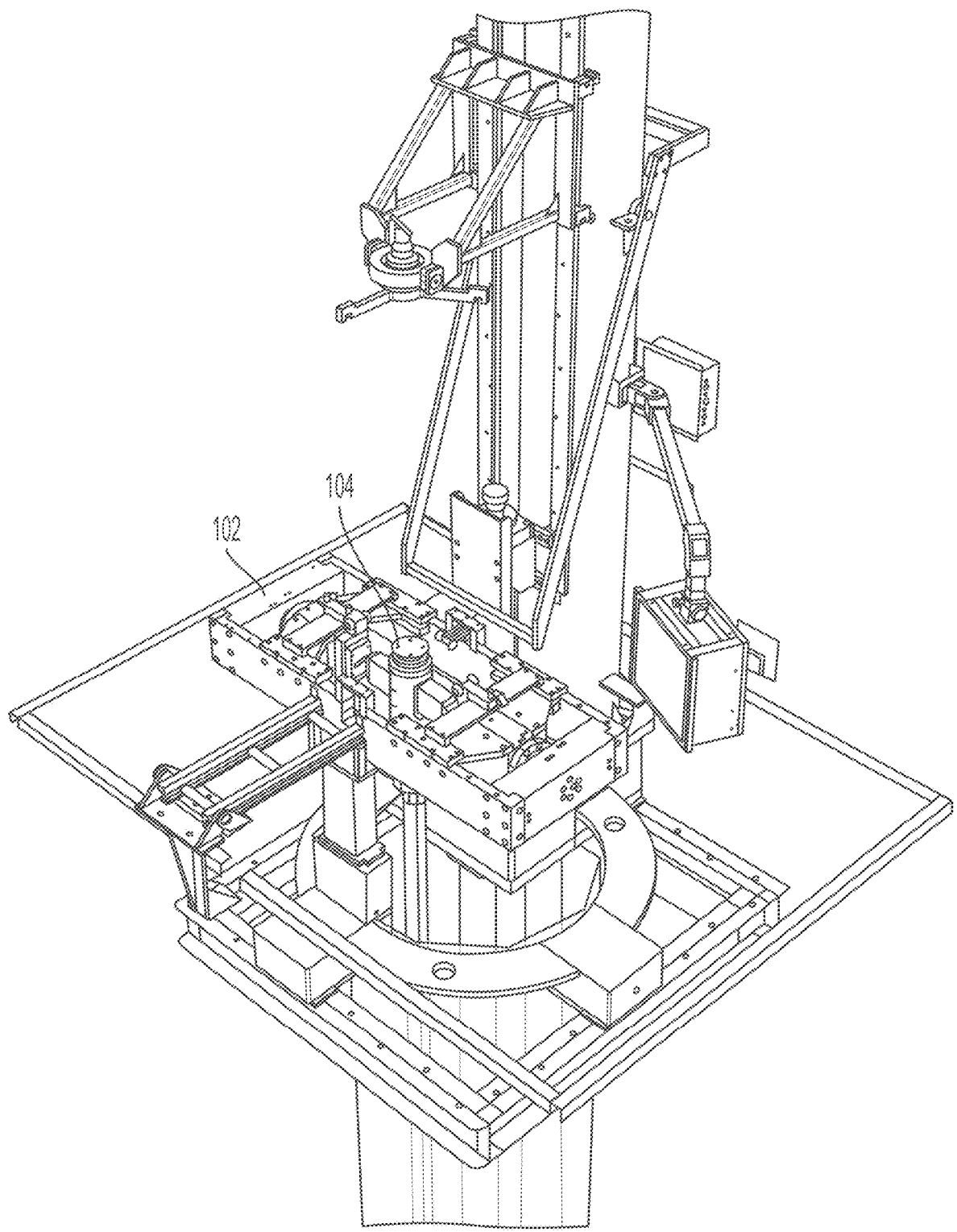
FIG. 3 depicts a view of a reaction table assembly and a perforator mandrel assembly of the louver perforation system, in accordance with various embodiments.
Figure 4:
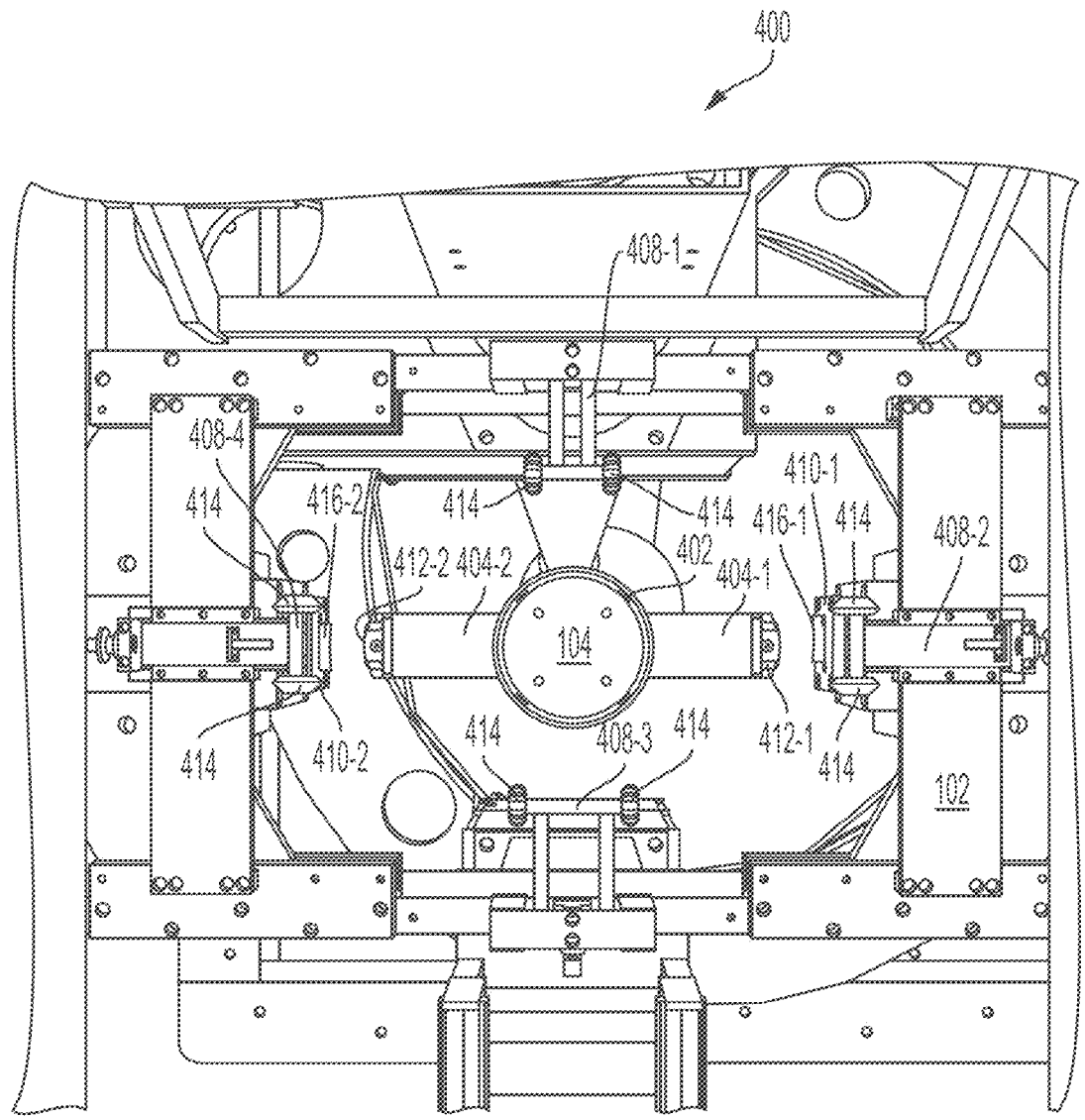
FIG. 4 depicts a detailed view of the reaction table assembly and the perforator mandrel assembly from above, in accordance with various embodiments.
Figure 5:
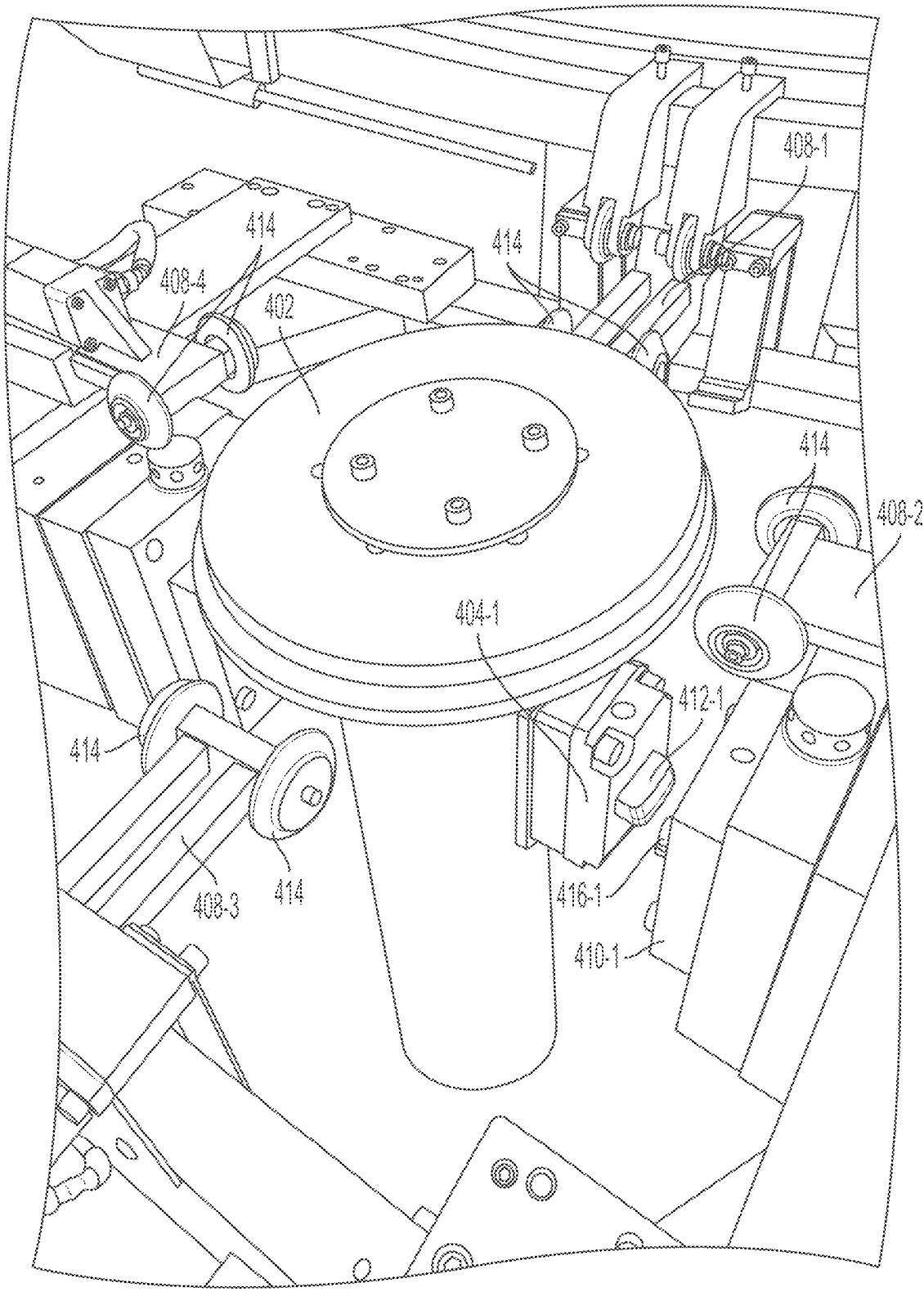
FIG. 5 depicts a detailed view of the reaction table assembly and the perforator mandrel assembly from a first side, in accordance with various embodiments.
Figure 6:
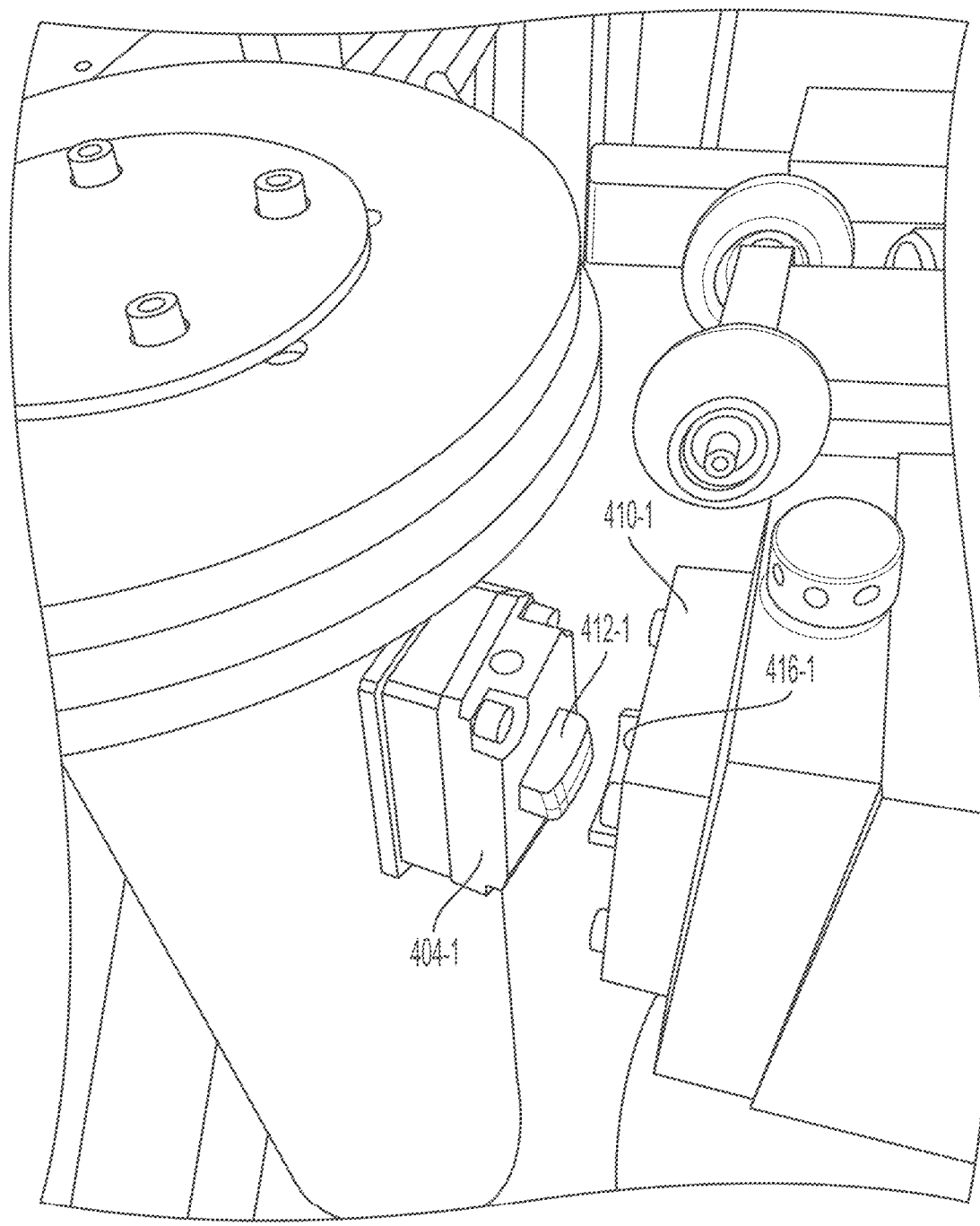
FIG. 6 depicts a detailed view of a first extendible reaction shoe and a first extendible perforator head, in accordance with various embodiments.
Figure 7:
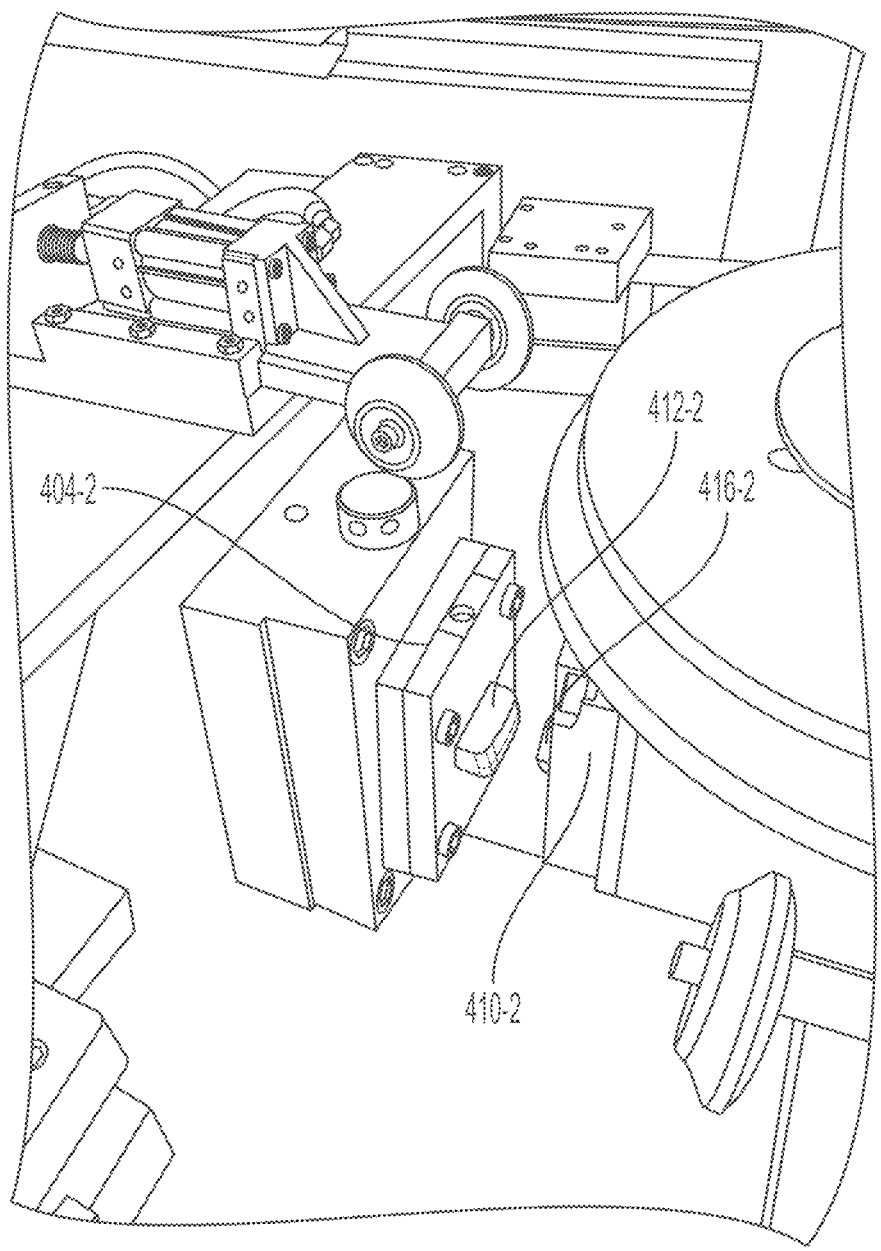
FIG. 7 depicts a detailed view of a second extendible perforator reaction shoe and a second extendible perforator head, in accordance with various embodiments.

Turning now to FIGS. 3 and 4, aspects of both the reaction table assembly 102 and the perforator mandrel assembly 104 will be discussed. Additional periodic attention is also directed to FIGS. 5-8 which illustrate multiple views of the subject matter of FIGS. 3 and 4. Supported by the vertical working mandrel 201 (FIG. 2), the perforator mandrel assembly 104 is disposed generally surrounded by the reaction table assembly 102 and in non-contacting relation to the reaction table assembly 102. As such, a pipe may be passed over the perforator mandrel assembly 104 so that a wall of the pipe is between features of the reaction table assembly 102 and the perforator mandrel assembly 104.

The reaction table assembly 102 may include centering roller arms. More specifically, the reaction table assembly 102 may include a first centering roller arm 408-1, a second centering roller arm 408-2, a third centering roller arm 408-3, and a fourth centering roller arm 408-4. However, any number of centering roller arms may be provided. The centering roller arm 408-1, 408-2, 408-3, 408-4 may comprise an arm extending cantilevered toward the perforator mandrel assembly 104. The centering roller arm 408-1, 408-2, 408-3, 408-4 may be configured to contact a pipe to stabilize the pipe and orient the pipe in a desired orientation relative to the perforator mandrel assembly 104. In various instances, the centering roller arm 408-1, 408-2, 408-3, 408-4 orients the pipe so that the perforator mandrel assembly 104 is centered inside the pipe. The centering roller arm 408-1, 408-2, 408-3, 408-4 may be selectably extendible and retractable to facilitate adjustment of the orientation of the pipe and to facilitate loading and unloading of the pipe from the louver perforation system 100.

In various instances, each centering roller arm 408-1, 408-2, 408-3, 408-4 includes one or more wheel 414. While FIGS. 4-7 depict two wheels 414 on each centering roller arm 408-1, 408-2, 408-3, 408-4, any number of wheels 414 may be provided. Wheels 414 facilitate continuing mechanical communication between the pipe and the centering roller arm 408-1, 408-2, 408-3, 408-4 while the pipe is indexed upward or downward relative to the perforator mandrel assembly 104. In this manner, centering of the pipe may be maintained during movement of the pipe so that unwanted interference, contact, and jostling is ameliorated.

The reaction table assembly 102 may include a first extendible perforator reaction shoe 410-1. The first extendible perforator reaction shoe 410-1 comprises an arm cantilevered toward the perforator mandrel assembly 104 and contactable to a pipe. The first extendible perforator reaction shoe 410-1 may be oriented to contact the pipe opposite of the aspect of the perforator mandrel assembly 104 that presses against the pipe to form a perforation therein. The first extendible perforator reaction shoe 410-1 extends toward and contacts the pipe while the perforation is being performed to provide an opposite reaction force to ameliorate unwanted deformation of the pipe. Moreover, the first extendible perforator reaction shoe 410-1 may provide a shearing edge so that, as the perforation is formed, penetration of the pipe is localized to the desired site of perforation.

The reaction table assembly 102 may include a second extendible perforator reaction shoe 410-2. The second extendible perforator reaction shoe 410-2 comprises an arm cantilevered toward the perforator mandrel assembly 104 and contactable to a pipe. The second extendible perforator reaction shoe 410-2 may be oriented to contact the pipe opposite of the aspect of the perforator mandrel assembly 104 that presses against the pipe to form a perforation therein. The second extendible perforator reaction shoe 410-2 extends toward and contacts the pipe while the perforation is being performed to provide an opposite reaction force to ameliorate unwanted deformation of the pipe. Moreover, second extendible perforator reaction shoe 410-2 may provide a shearing edge so that, as the perforation is formed, penetration of the pipe is localized to the desired site of perforation.

Thus, one may appreciate from the preceding discussion that two extendible perforator reaction shoes (a first extendible perforator reaction shoe 410-1 and a second extendible perforator reaction shoe 410-2) may be provided. In further instances, any number of extendible perforator reaction shoes may be provided. In various embodiments, the first extendible perforator reaction shoe 410-1 and the second extendible perforator reaction shoe 410-2 are disposed opposite each other and in a line with each other, so each is aligned with an imaginary line passing through a center of the perforator mandrel assembly 104 and on opposite sides of the perforator mandrel assembly 104 when viewed from above and looking down along a central axis of the perforator mandrel assembly 104.

Each of the extendible perforator reaction shoes may support a reaction shoe blade. For instance, the first extendible perforator reaction shoe 410-1 may support a first reaction shoe blade 416-1 disposed at an end of the first extendible perforator reaction shoe 410-1. The second extendible perforator reaction shoe 410-2 may support a second reaction shoe blade 416-2 disposed at an end of the second extendible perforator reaction shoe 410-2. These blades may provide the aforementioned shearing edge to localize penetration of the pipe to a desired site of perforation. Moreover, these blades may comprise shapes corresponding to a profile of the pipe, to distribute reaction forces across an outer surface of the pipe during formation of perforations.

Having completed an introduction of features of the reaction table assembly 102, attention is now directed to aspects of the perforator mandrel assembly 104. The perforator mandrel assembly 104 may include a pipe alignment flange 402. The pipe alignment flange 402 may comprise a circular flange that is smaller than an inner diameter of a pipe being processed. In various embodiments, the pipe alignment flange 402 is sized to remain in contacting relation to an inner surface of the pipe being processed. In further instances, the pipe alignment flange 402 is sized to remain loosely coupled and/or in non-contacting relation to an inner surface of the pipe, but of sufficient size to constrain movement of the pipe. In various instances, the pipe alignment flange 402 is attached to the vertical working mandrel 201 (FIG. 2) at an uppermost end of the vertical working mandrel 201 (FIG. 2) (e.g., at the end opposite the lower mandrel pipe stand 208 (FIG. 2)). In various embodiments, the pipe alignment flange 402 resists deformation of the pipe from a circular cross-section.

The perforator mandrel assembly 104 may include a first extendible perforator head 404-1. The first extendible perforator head 404-1 comprises an arm cantilevered toward the reaction table assembly 102 from the vertical working mandrel 201 (FIG. 2). The first extendible perforator head 404-1 may be contactable to a pipe. Moreover, the first extendible perforator head 404-1 may contact the pipe on an inside of the pipe and may exert an outward force on the inside of the pipe, penetrating the pipe to cause a perforation of the pipe. The first extendible perforator head 404-1 may be oriented to contact the pipe opposite of the aspect of the perforator mandrel assembly 104 that provides the opposite reaction force to ameliorate unwanted deformation of the pipe. More specifically, the first extendible perforator head 404-1 may be oriented to contact the pipe opposite of the first extendible perforator reaction shoe 410-1. The first extendible perforator head 404-1 may be extendible and retractable by a motor, hydraulic cylinder, and/or other force generating apparatus.

The perforator mandrel assembly 104 may include a second extendible perforator head 404-2. The second extendible perforator head 404-2 comprises an arm cantilevered toward the reaction table assembly 102 from the vertical working mandrel 201 (FIG. 2). The second extendible perforator head 404-2 may be contactable to a pipe. Moreover, the second extendible perforator head 404-2 may contact the pipe on an inside of the pipe and may exert an outward force on the inside of the pipe, penetrating the pipe to cause a perforation of the pipe. The second extendible perforator head 404-2 may be oriented to contact the pipe opposite of the aspect of the perforator mandrel assembly 104 that provides the opposite reaction force to ameliorate unwanted deformation of the pipe. More specifically, the second extendible perforator head 404-2 may be oriented to contact the pipe opposite of the second extendible perforator reaction shoe 410-2. The second extendible perforator head 404-2 may be extendible and retractable by a motor, hydraulic cylinder, and/or other force generating apparatus.

Thus, one may appreciate from the preceding discussion that two extendible perforator heads (a first extendible perforator head 404-1 and a second extendible perforator head 404-2) may be provided. In further instances, any number of extendible perforator heads may be provided. In various embodiments, the first extendible perforator head 404-1 and the second extendible perforator head 404-2 are disposed opposite each other and in a line with each other, so each is aligned with an imaginary line passing through a center of the perforator mandrel assembly 104 and on opposite sides of the perforator mandrel assembly 104 when viewed from above and looking down along a central axis of the perforator mandrel assembly 104.

Each of the extendible perforator heads may support a perforator blade. For instance, the first extendible perforator head 404-1 may support a first perforator blade 412-1 disposed at an end of the first extendible perforator head 404-1. The second extendible perforator head 404-2 may support a second perforator blade 412-2 disposed at an end of the second extendible perforator head 404-2. These blades may concentrate force generated by the extending perforator head onto an area of the pipe to form penetrations therein. Moreover, these blades may have a shape to create a desired contour of the louver penetration formed in the pipe.

Figure 8A:
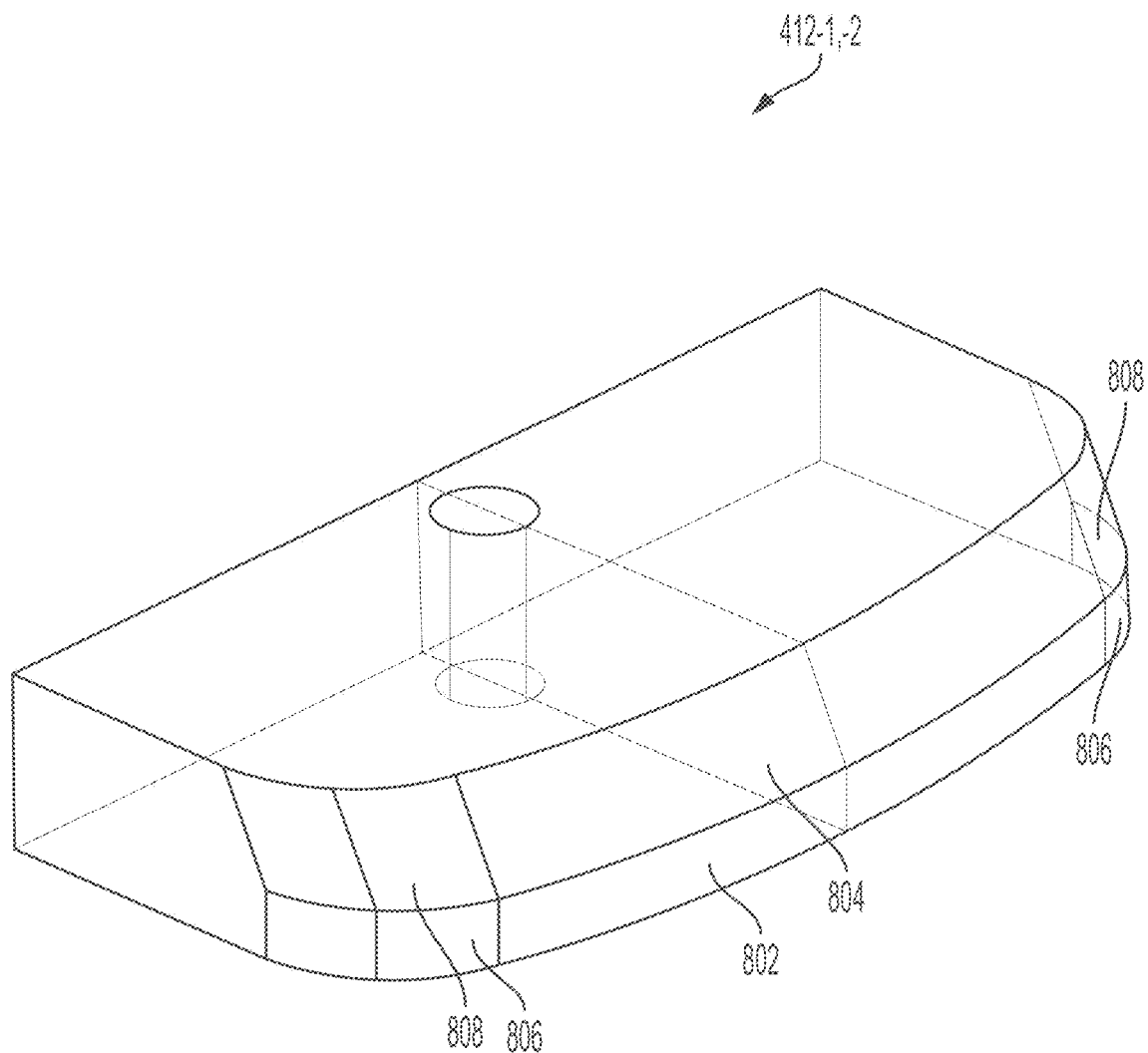
FIGS. 8A and 8B depict example perforator blades attachable to the first or the second extendible perforator head, in accordance with various embodiments.
Figure 8B:
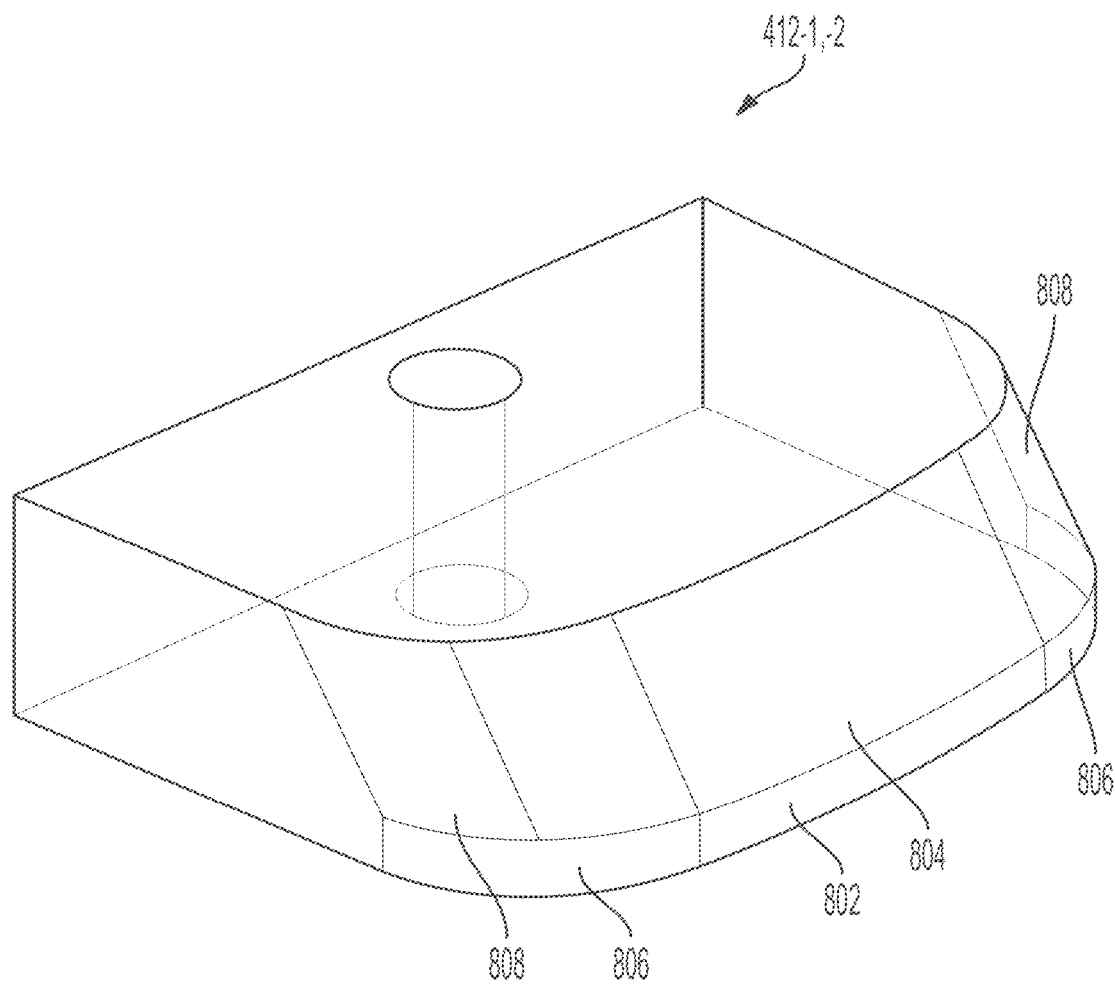

Directing attention to FIGS. 8A-B, example configurations of the first perforator blade 412-1 and the second perforator blade 412-2 are depicted. Various features of the extendible perforator blades may have different dimensions depending on a desired shape of the louver penetration.

For instance, the first perforator blade 412-1 and the second perforator blade 412-2 may have a shearing face 802. A shearing face 802 may comprise an outward-most portion of the perforator blade 412-1, 412-2. As used herein, outward-most means the portion of the perforator blade 412-1, 412-2 that makes first contact to the pipe during formation of a perforation. The shearing face 802 may comprise a curved face. The shearing face 802 may concentrate a force on the pipe to cause a penetration to shear into the pipe.

The first perforator blade 412-1 and the second perforator blade 412-2 may have a ramping face 804. The ramping face 804 may comprise an inclined surface that joins to the shearing face 802 at an inclined angle. The ramping face 804 may progressively bend a portion of the pipe outwardly away from the circumferential profile of the pipe in order to establish a louver penetration. As the perforator blade 412-1, 412-2 passes outwardly through the pipe, interference between the inclined surface of the ramping face 804 and the pipe causes a local and progressive bending.

The first perforator blade 412-1 and the second perforator blade 412-2 may have a shearing corner 806. The perforator blade 412-1, 412-2 may have two shearing corners 806 disposed on opposite sides of the shearing face 802. A shearing corner 806 comprises a portion of the perforator blade 412-1, 412-2 that makes contact to the pipe during formation of a perforation. The shearing corner 806 may be a curved surface of the perforator blade 412-1, 412-2 that rounds the ends of the shearing face 802. This may provide for a gradual transition of the pipe from a penetration sheared into the pipe by the shearing face 802 to a non-penetrated area of the pipe. By transitioning gradually, localized stress concentrations adjacent the louver perforations in the finished pipe with louver perforations may be ameliorated.

The first perforator blade 412-1 and the second perforator blade 412-2 may have a ramping corner 808. The ramping corner 808 may comprise an inclined surface that joins to the shearing corner 806 at an inclined angle. The ramping corner 808 may progressively bend a portion of the pipe outwardly away from the circumferential profile of the pipe in order to establish the louver penetration. As the perforator blade 412-1, 412-2 passes outwardly through the pipe, interference between the inclined surface of the ramping corner 808 and the pipe causes a local and progressive bending. The ramping corner 808 may round the ends of the ramping face 804. This may provide for a gradual transition of the pipe from a bent portion proximate the penetration sheared into the pipe to a non-bent area of the pipe. By transitioning gradually, localized stress concentrations adjacent the louver perforations in the finished pipe with louver perforations may be ameliorated. Moreover, undesirable tearing of the pipe wall may be ameliorated as louvers are formed with gradually bending features rather than discontinuous bends. In this manner, louver penetrations may be formed without removing material from the pipe, but rather by penetrating and bending local features. Thus, the first perforator blade 412-1 and the second perforator blade 412-2 may each have a shearing face 802 having an edge to contact and shear through the pipe and a ramping face 804 connected at an angle to the edge of the shearing face 802 and providing a surface to bend the pipe forming a louver without removing material from the pipe. The first perforator blade 412-1 and the second perforator blade 412-2 may further include a shearing corner 806 having a curved edge to contact and shear through the pipe, the shearing corner 806 adjacent the shearing face 802. The first perforator blade 412-1 and the second perforator blade 412-2 may each include a ramping corner 808, having a curved face connected at an angle to the curved edge of the shearing corner 806 and providing a surface to bend the pipe forming the louver without further tearing of the pipe that has been sheared by the shearing face 802 and shearing corner 806.

Figure 9A:
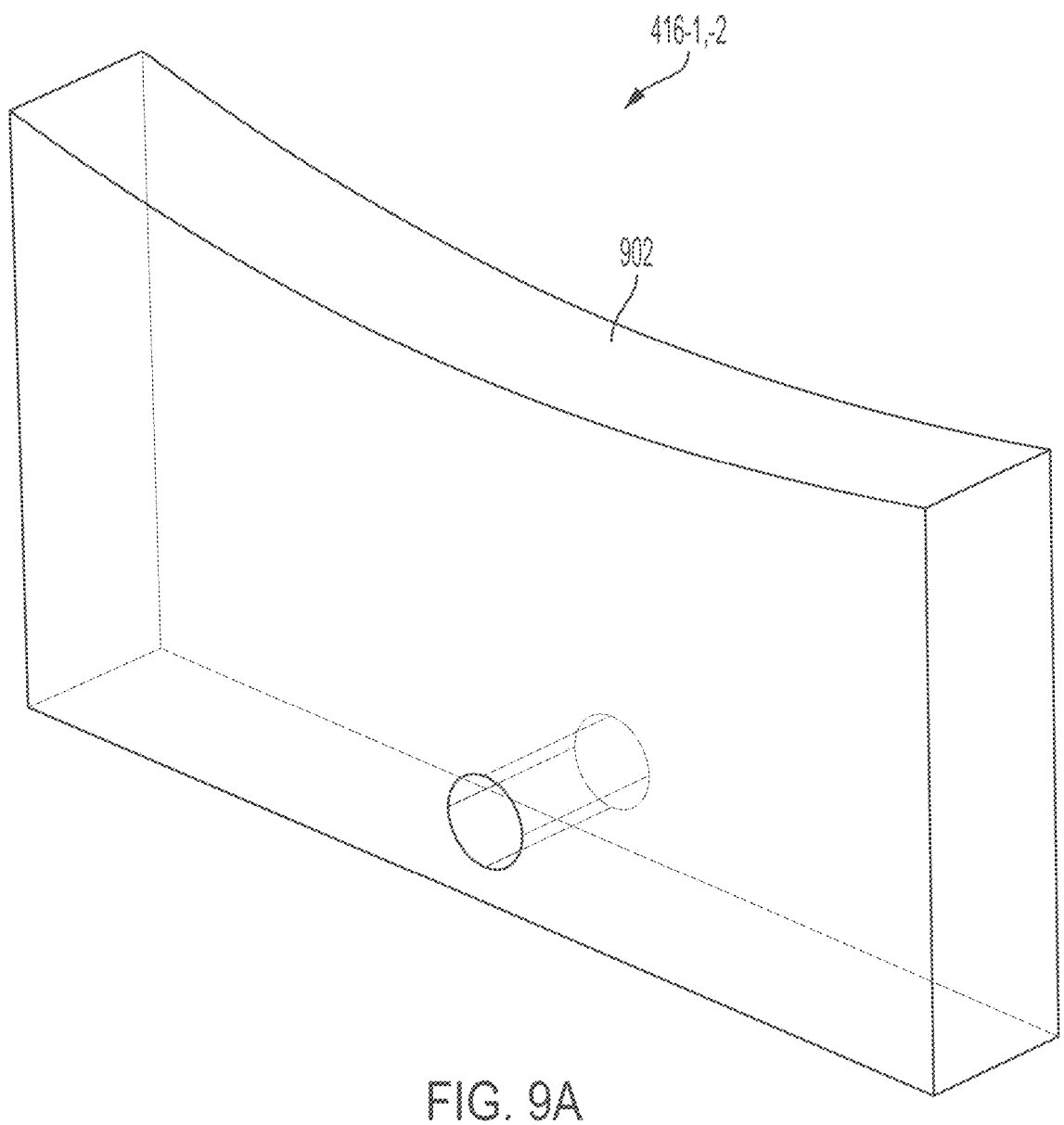
FIGS. 9A and 9B depict example reaction shoe blades attachable to the first or the second extendible reaction shoe, in accordance with various embodiments.
Figure 9B:
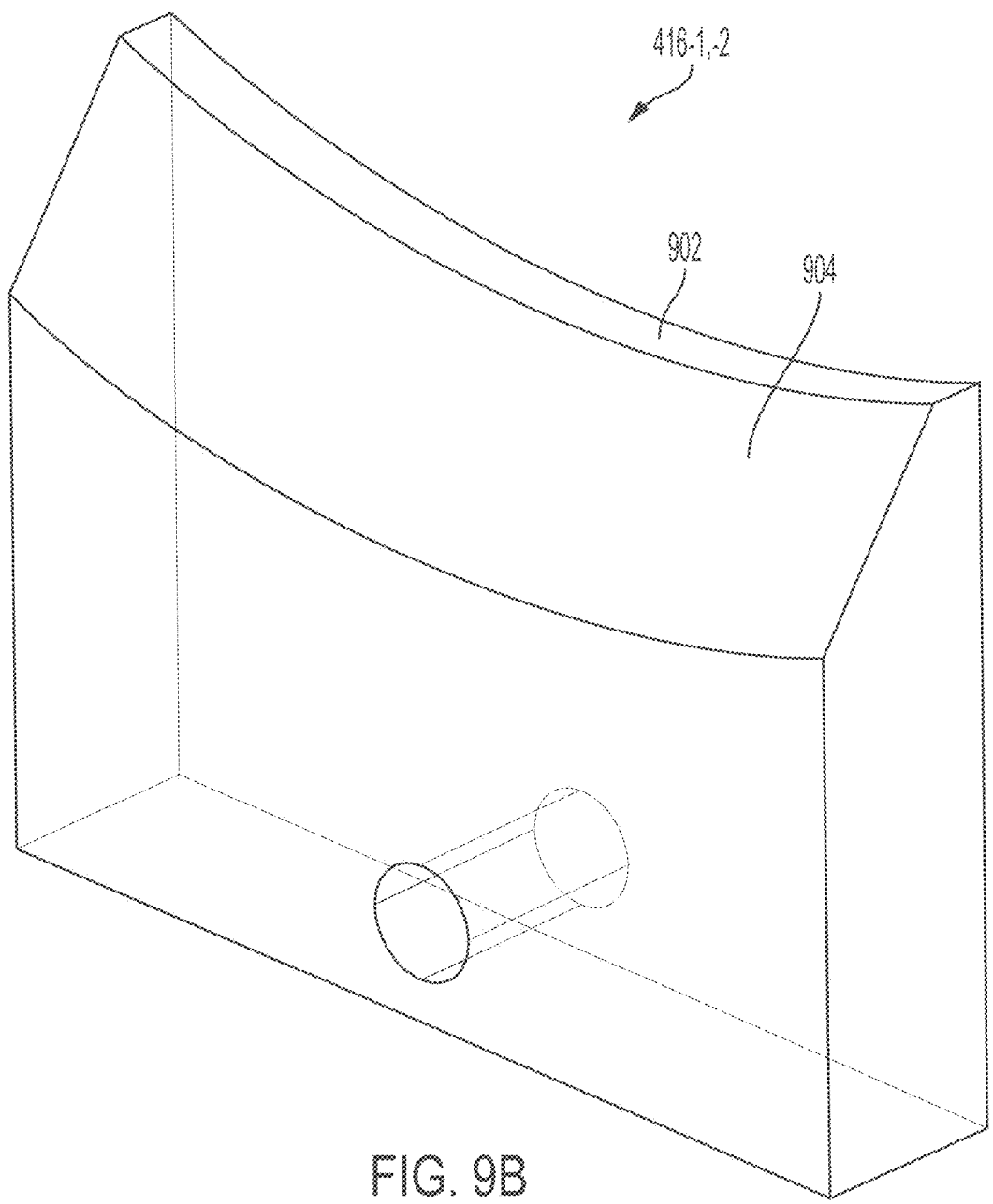

Directing attention to FIGS. 9A-B, example configurations of the first reaction shoe blade 416-1 and the second reaction shoe blade 416-2 are depicted. Various features of the reaction shoe blades may have different dimensions depending on a desired shape of the louver penetration. For instance, a reaction shoe blade may have an arcuate reaction face 902. An arcuate reaction face 902 comprises a flat curve that corresponds in shape to that of a pipe. The arcuate reaction face 902 may be pressed against the pipe to support the pipe during formation of the louver penetration. Moreover, the arcuate reaction face 902 may provide a reaction force to that of the perforator blade, but slightly off axis from the perforator blade, such as being slightly above or below where the perforator blade contacts the pipe. This intentional misalignment concentrates the shearing force locally so that rather than exhibiting a large area of plastic deformation, the pipe exhibits a local penetration.

In various instances, the first reaction shoe blade 416-1 and the second reaction shoe blade 416-2 further comprises a ramping face 904. The ramping face 904 may connect at an angle to the arcuate reaction face 902 and may provide a stop for the louver being formed by the ramping face 804 (FIG. 8A-B) of the perforator blade 412-1, 412-2 (FIG. 8A-B). In this manner, the shape of the bent portion of the louver penetration may be constrained.

Figure 10A:
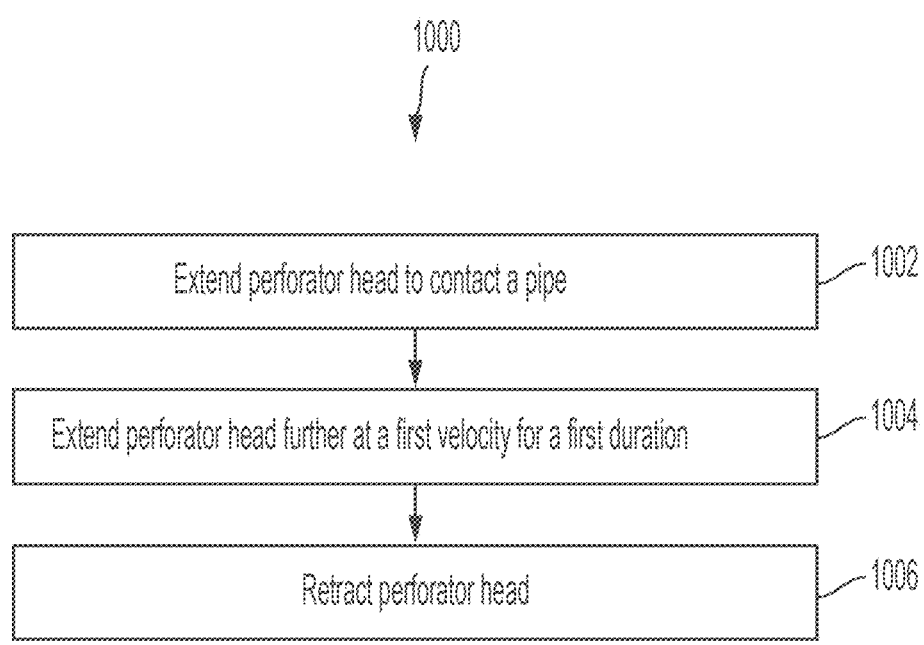
FIG. 10A depicts a method of sizing a perforation formed by the louver perforation system, in accordance with various embodiments.

Having discussed aspects of the louver perforation system 100, attention is directed to FIG. 10A for a discussion of a method of sizing a perforation formed by the louver perforation system. In various embodiments, a method 1000 may include extending a first perforator head to cause a first perforator blade to contact a pipe (block 1002). Subsequently, the method 1000 may include extending the first perforator head further at a first velocity for a first duration of time (block 1004). After the first duration of time, the method may continue, including retracting the perforator head (block 1006). In various instances, the perforation size corresponds to the length of the first duration of time. The first duration of time may be greater for a larger perforation, and lesser for a smaller perforation. Thus, one may appreciate that, the perforator blade may pass further through the pipe so that the ramping face of the perforator blade passes further through the pipe and the opening becomes larger as the ramping face bends the louver increasingly further outward of the circumferential profile of the pipe.

Thus, one may also appreciate that the method may be performed in parallel or in sequence with a similar method for a second perforator head causing a second perforator blade to form a perforation. For instance, the method may include extending the first perforator head to cause the first perforator blade to contact the pipe and extending the second perforator head to cause the second perforator blade to contact the pipe. The method may include extending the first perforator head further at a first velocity for a first duration of time to form a first perforation in the pipe and extending the second perforator head further at a second velocity for a second duration of time to form a second perforation in the pipe. A size of the first perforation corresponds to a length of the first duration, and a size of the second perforation corresponds to a length of the second duration.

In such instances, the first duration and the second duration may be simultaneous. The first duration and the second duration may be a same duration. Similarly, the first velocity and the second velocity may be a same velocity. The first velocity and the second velocity may be constant. Importantly, the first perforator blade and the second perforator blade may operate without removing material from the pipe during the perforating.

Figure 10B:
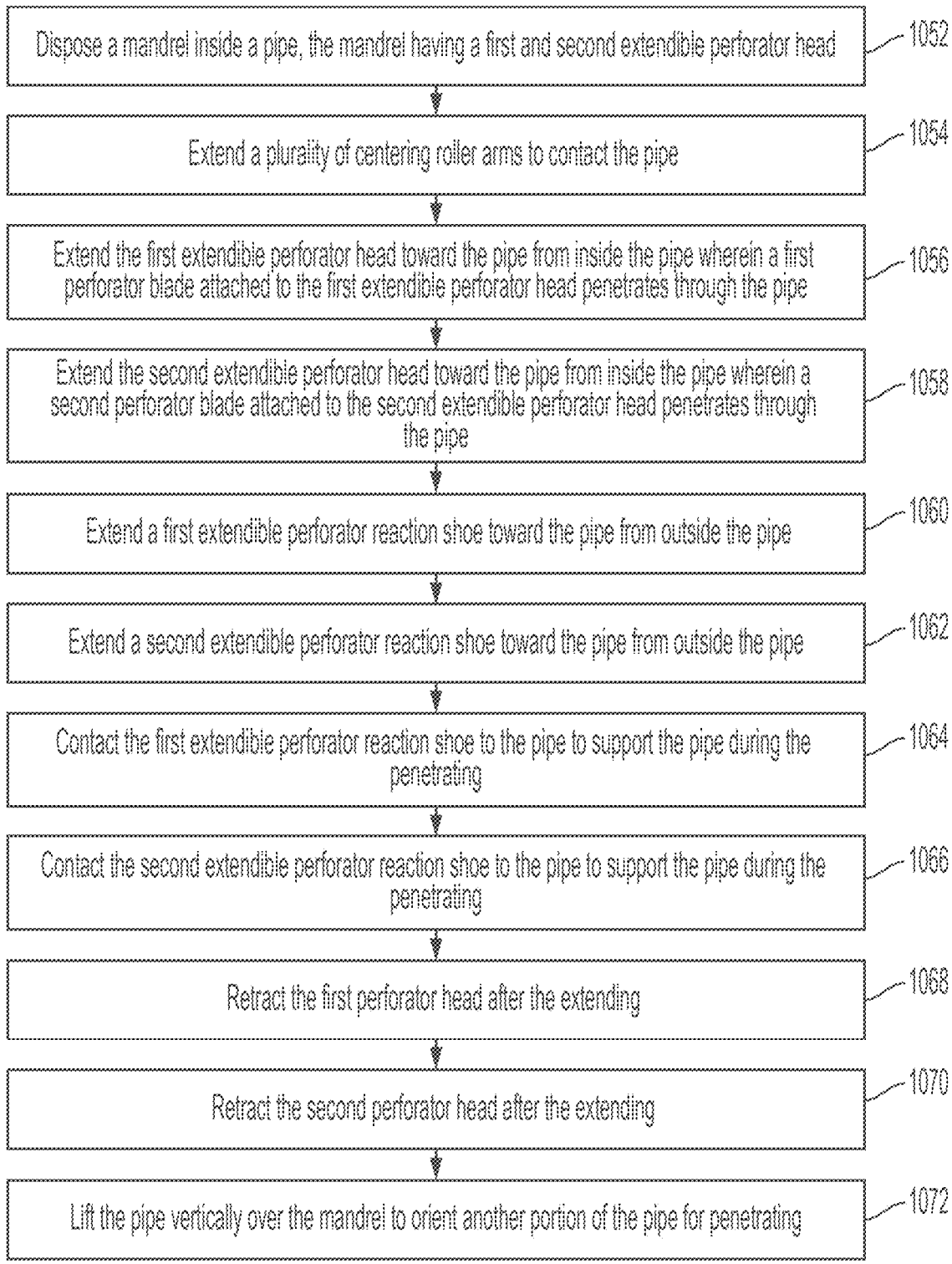
FIG. 10B depicts a method of creating a pipe perforation, in accordance with various embodiments.

Attention is also directed to FIG. 10B for a discussion of a method of creating a pipe perforation by the system herein. The method may include disposing a mandrel inside a pipe, the mandrel having a first and second extendible perforator head (block 1052). The method may include extending a plurality of centering roller arms to contact the pipe (block 1054). The first extendible perforator head may extend toward the pipe from inside the pipe and a first perforator blade attached to the first extendible perforator head may penetrate through the pipe (block 1056). The second extendible perforator head may also extend toward the pipe from inside the pipe and a second perforator blade attached to the second extendible perforator head may penetrate through the pipe (block 1058). A first extendible perforator reaction shoe may also be extended toward the pipe from the outside of the pipe (block 1060), and a second extendible perforator reaction shoe may be extended toward the pipe from outside the pipe (block 1062). The first extendible perforator reaction shoe may be extended until it contacts the pipe to support the pipe during penetrating (block 1064). The second extendible perforator reaction shoe may be extended until it contacts the pipe to support the pipe during penetrating (block 1066). After the extending of the first perforator head to penetrate through the pipe, the first perforator head may be retracted (block 1068). Similarly, after the extending of the second perforator head to penetrate through the pipe, the second perforator head may be retracted (block 1070). Finally, the pipe is lifted vertically over the mandrel to orient another portion of the pipe adjacent the perforator heads for penetrating (block 1072).

Pipe Transportation System

A louver perforation system may interoperate with other systems during operation. For instance, a pipe transportation system may also be provided to carry pipes to the louver perforation system, to move pipes during louver perforation so that the louvers are formed in spaced apart relation along the pipe, and then to carry pipes away from the louver perforation system after processing. For the following discussion, references to "processing" of a pipe mean perforating louvers in the pipe. However, processing can also refer to other work performed on the pipe.

With reference to FIG. 11, a pipe transportation system 1100 is provided. The pipe transportation system may include trolley carts (e.g., first trolley cart 1102-1 and second trolley cart 1102-2). A trolley cart is a wheeled fixture that can support a pipe and can move about while supporting the pipe so that the pipe is also moved about. In various embodiments, the trolley carts travel toward and away from the louver perforation system to move pipes into place for processing, and then take processed pipes having louver perforations away from the system. While two trolley carts are depicted, one or three or any number may be implemented.

A trolley track 1104 may be provided. The first trolley cart 1102-1 and the second trolley cart 1102-2 may roll on the trolley track 1104. The trolley track 1104 may guide the motion of the trolley carts and constrain the motion to a desired direction. For instance, the trolley track 1104 may guide motion of the trolley carts toward and away from the louver perforation system so that the pipes are guided to the louver perforation system end-first.

The pipe transportation system 1100 may include a loading bridge 1106. The loading bridge 1106 comprises a selectably extendable structure that can provide a path for an end of a pipe between a perforator mandrel assembly 104 (FIG. 1) of a louver perforation system and the trolley carts 1102-1, 1102-2. In this manner, the pipe may be guided from the trolley cart into the louver perforation system and out of the louver perforation system. The loading bridge 1106 may also be retracted out of the way during processing of the pipe.

The pipe transportation system 1100 may include a carriage tower 1108. The carriage tower 1108 comprises a vertically extending structure adjacent to the louver perforation system and extending vertically above the louver perforation system.

The carriage tower 1108 may include various features. For instance, the carriage tower 1108 may have pipe carriage track 1112 attached to the side of the carriage tower 1108 to support and guide a movable pipe carriage 1110. The carriage tower 1108 may support the movable pipe carriage 1110 in traveling up and down the pipe carriage track 1112 on the carriage tower 1108. For example, a hydraulic cylinder, a motor, or any other motion-imparting apparatus may be configured to cause the movable pipe carriage 1110 to travel up and down the pipe carriage track 1112 on the carriage tower 1108. The movable pipe carriage 1110 may travel between a raised position 1116 and a lowered position 1118, transporting a pipe along a central axis 1120. A pipe being processed by the louver perforation system may be connected to the movable pipe carriage 1110 so that, as the movable pipe carriage 1110 travels up and down the side of the carriage tower 1108, the pipe is lifted and lowered along central axis 1120. The carriage tower 1108 may be positioned so that the pipe lifts and lowers over the vertical working mandrel 201 (FIG. 2) so that perforations may be formed at desired locations along the length of the pipe.

Finally, the pipe transportation system 1100 may include a kickout arm 1114. A kickout arm 1114 comprises a frame that cantilevers away from the carriage tower 1108 and hingeably raises and lowers between a position generally parallel to the central axis 1120 and the carriage tower 1108 to a position angled from the carriage tower 1108 toward the trolley track 1104. Thus, a pipe may be selectably contacted and repositioned by the kickout arm 1114. In various instances, a pipe being carried by the movable pipe carriage 1110 may be lifted so that a lower end of the pipe is free from the working pit 106 (FIG. 1) and vertical working mandrel 201 (FIG. 2), then the kickout arm 1114 may be raised to push the lower end of the pipe out of alignment with central axis 1120. Stated differently, the kickout arm may include a cantilevered frame movable about an axis of rotation provided by a joint between the kickout arm and the carriage tower, wherein the kickout arm cantilevers away from the carriage tower to push the pipe away from the machine after processing. The movable pipe carriage 1110 may then be lowered down the carriage tower 1108 toward the lowered position 1118, causing the lower end of the pipe to travel down the kickout arm 1114 and at an angle away from the louver perforation system and toward the trolley carts 1102-1, 1102-2.

Figure 12:
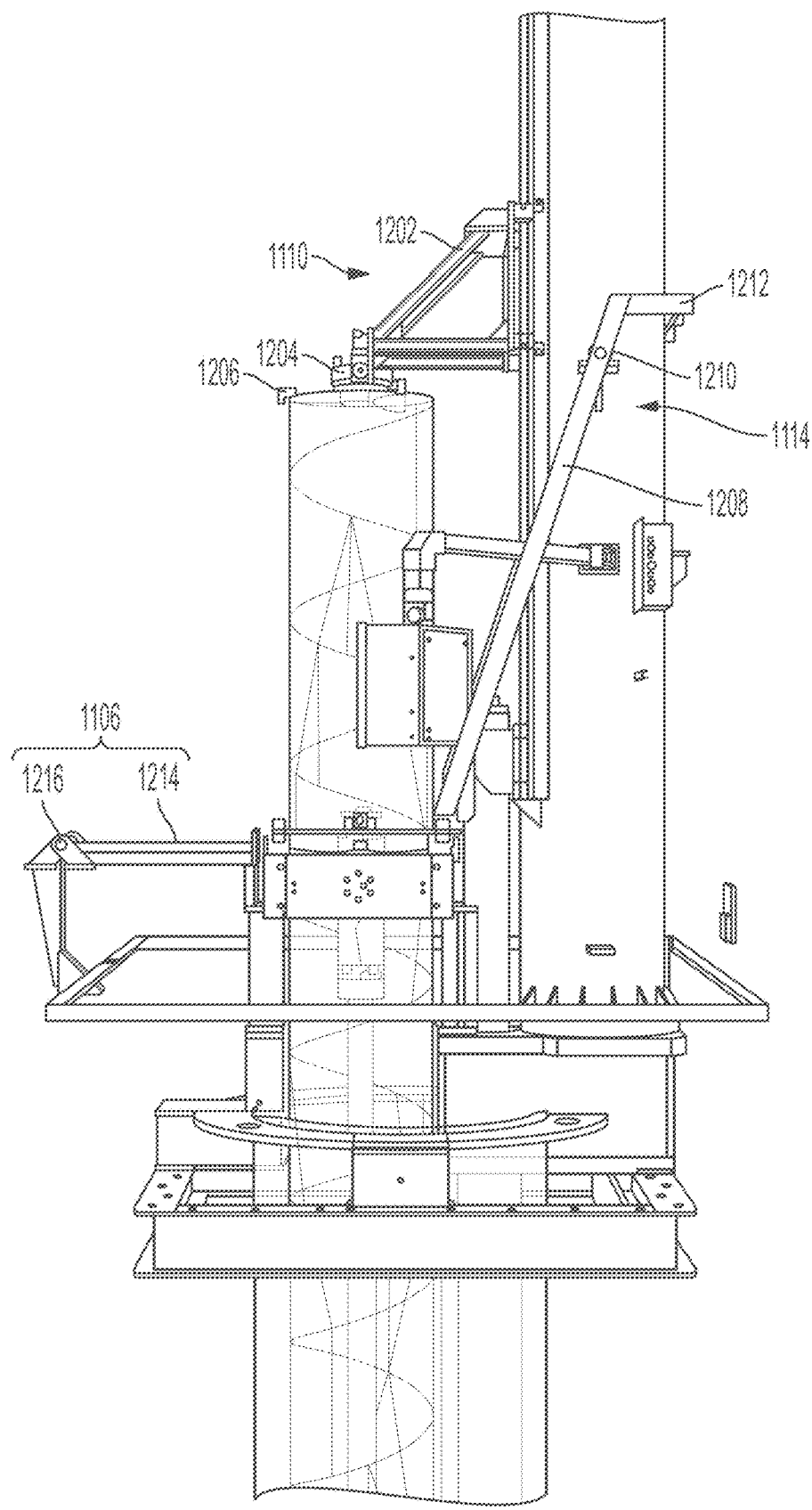
FIG. 12 depicts a side view of aspects of the pipe transportation system, in accordance with various embodiments.

Directing focus to FIG. 12, features of the kickout arm are shown in greater detail. The kickout arm may comprise a cantilevered trough 1208, a hinge 1210, and a linear reaction arm 1212. The hinge 1210 may attach the kickout arm 1114 to the carriage tower 1108 at a location between the cantilevered trough 1208 and the linear reaction arm 1212. The cantilevered trough 1208 may selectably push the lower end of the pipe out of alignment with the central axis 1120 (FIG. 11) in response to a motor, hydraulic cylinder, or other motion imparting apparatus drawing the linear reaction arm 1212 downward or pushing the linear reaction arm 1212 upward. Thus, a linear movement of the linear reaction arm 1212 may impart an angular movement to the cantilevered trough 1208.

FIG. 12 also depicts features of the loading bridge 1106. The loading bridge may comprise a cantilevered trough 1214. The cantilevered trough 1214 provides a resting surface for a pipe. The cantilevered trough 1214 may extend in a generally horizontal direction providing a bridge from the louver perforation system to an area adjacent the louver perforation system where the trolley carts may be. The cantilevered trough 1214 may guide an end of a pipe at a desired height and in a desired direction to facilitate loading of the pipe onto the trolley cart.

The loading bridge may comprise a hinge 1216. The hinge 1216 may be at an end of the cantilevered trough 1214, thus establishing the cantilever of the cantilevered trough 1214. The cantilevered trough 1214 may be rotatable about the hinge 1216. Thus, the hinge facilitates the emplacement of the cantilevered trough 1214, and then the removal of the cantilevered trough 1214 to an orientation clear of the louver perforation system. Yet furthermore, the hinge 1216 facilitates disposition of the loading bridge at intermediate and/or angled orientations to further facilitate positioning of an end of a pipe.

Figure 13:
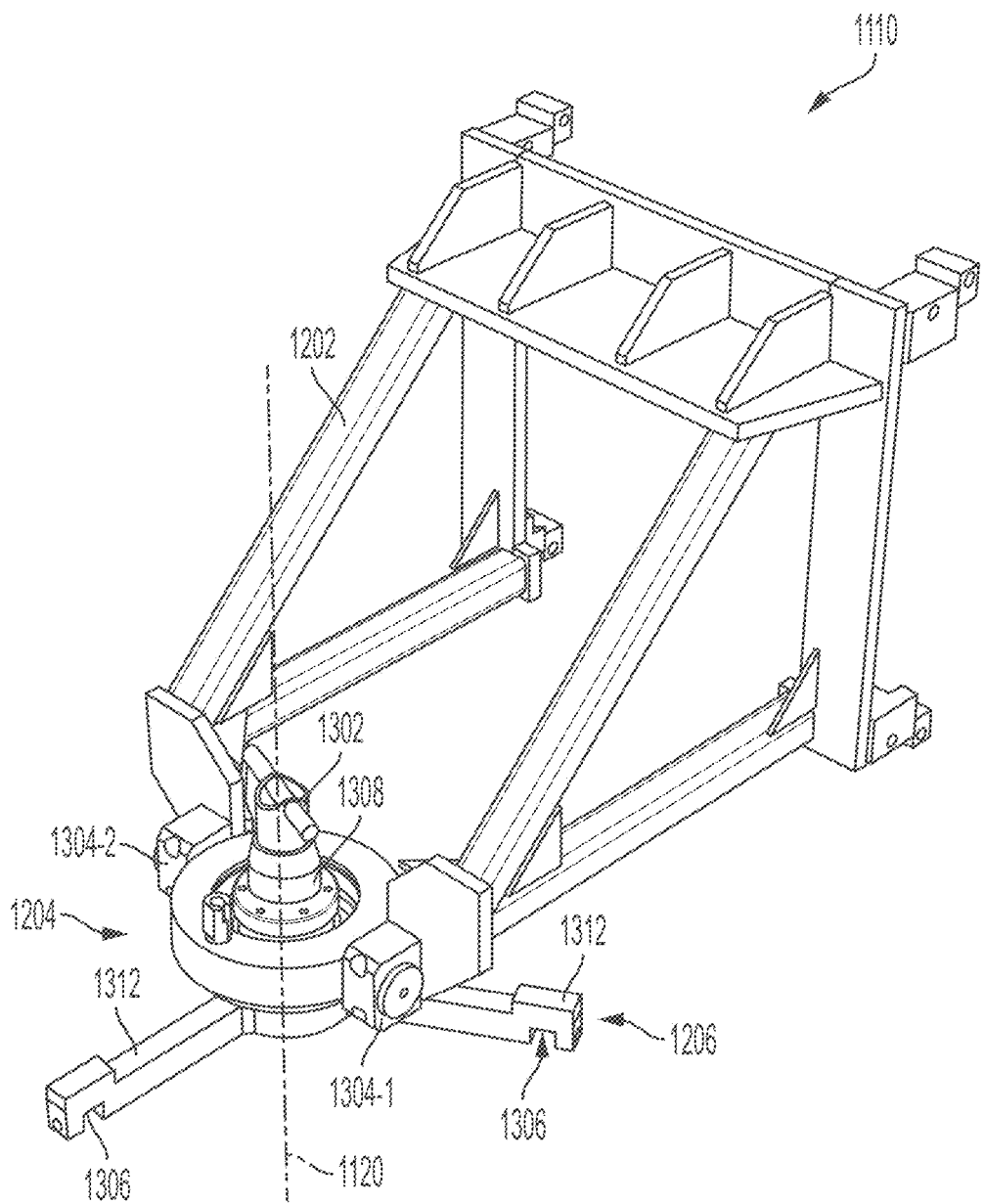
FIG. 13 depicts a movable pipe carriage of the pipe transportation system, in accordance with various embodiments.
Figure 14:
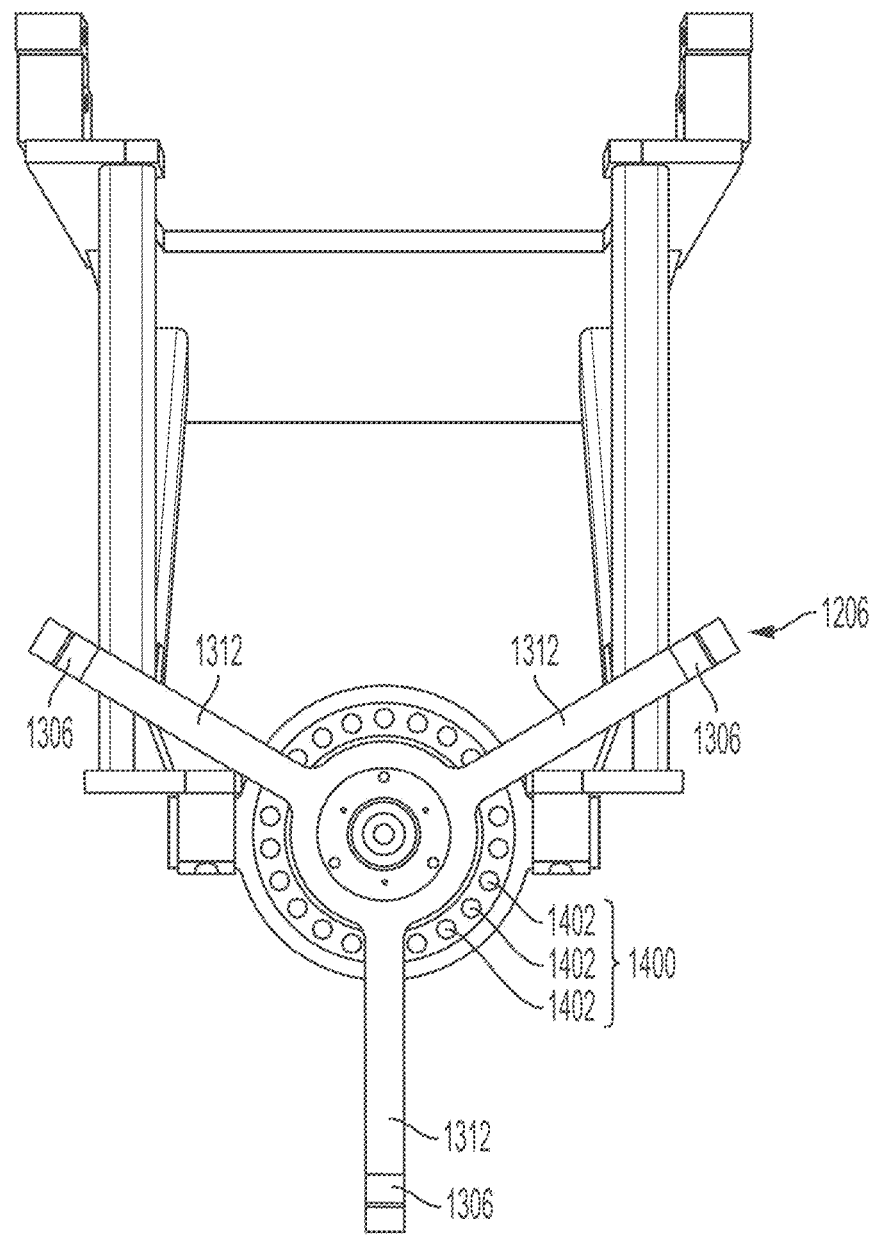
FIG. 14 depicts a bottom view of the movable pipe carriage of the pipe transportation system, in accordance with various embodiments.

Continuing with reference to FIG. 12, but with additional reference to FIGS. 13 and 14, features of the movable pipe carriage 1110 are depicted. The movable pipe carriage 1110 may comprise a carriage frame 1202. The carriage frame 1202 comprises an assembly of pipes, bars, beams, and/or the like to carry a pipe and dispose the pipe along a central axis 1120 (FIG. 11) while the movable pipe carriage 1110 moves up and down. The carriage frame 1202 may support an indexing lift trunnion 1204 at a distance from the pipe carriage track 1112 (FIG. 11) which may connect to a clamping frame 1206 attached to the pipe.

The clamping frame 1206 comprises a set of interconnected arms selectably attachable to a pipe and also selectably attachable to the movable pipe carriage 1110. The clamping frame 1206 may be attached to the pipe while the pipe is generally horizontal, then may be joined to the movable pipe carriage 1110 and support the pipe as the movable pipe carriage 1110 raises and the pipe transitions to a generally vertical orientation.

The indexing lift trunnion 1204 may provide a rotatable connection between the clamping frame 1206 attached to the pipe and the movable pipe carriage 1110, so that the pipe can be rotated into different orientations relative to the louver penetration system. State differently, the indexing lift trunnion 1204 may provide a rotatable connection that allows the pipe to be circumferentially indexed so that the louver penetration system forms a louver penetration on a desired spot around the circumference of the pipe. The indexing lift trunnion 1204 attaches the pipe to the movable pipe carriage 1110 so that the pipe may be longitudinally indexed by raising and lowering of the movable pipe carriage 1110 so that the louver penetration system forms the louver penetration on a desired spot along the length of the pipe. Finally, the indexing lift trunnion 1204 includes trunnions so that the pipe may be angled away from the central axis 1120 (FIG. 11) for loading and unloading from a horizontal orientation on the trolley carts to a vertical orientation over the vertical working mandrel 201 (FIG. 2) during formation of the louver perforations by the louver perforation system.

The indexing lift trunnion 1204 has a variety of features. For instance, the indexing lift trunnion 1204 has a first trunnion pin 1304-1 and a second trunnion pin 1304-2. These trunnion pins facilitate articulation of the clamping frame 1206 relative to the movable pipe carriage 1110 so that the pipe may vary between horizontal and vertical orientations.

The indexing lift trunnion 1204 may also have a pipe spindle 1308. The pipe spindle 1308 comprises a spindle connectable to the clamping frame 1206 and rotatably fixable to the movable pipe carriage 1110. An indexing grip 1302 may comprise a handle adjacent an end of the pipe spindle 1308. An operator, motor, or other rotational movement source may impart a rotation to the indexing grip 1302, causing the pipe spindle 1308 to rotate and the pipe to be circumferentially indexed to a desired orientation.

The indexing lift trunnion 1204 and the clamping frame 1206 may cooperate to facilitate retention of the pipe in a desired circumferential index. For instance, the clamping frame 1206 includes a plurality of clamping arms 1312, each of which extends with a pipe channel 1306 adjacent an end of the clamping arm 1312 that can receive an edge of a pipe therein and secure the pipe in mechanical union with the clamping frame 1206. The clamping frame 1206 also has an array of apertures (e.g., an indexing aperture array 1400) disposed in a circular pattern in a central area of the clamping frame 1206. These apertures (e.g., indexing apertures 1402) pass under a corresponding aperture fixed in position on the indexing lift trunnion 1204. As the indexing grip 1302 is manipulated to circumferentially index the pipe, a pin may be inserted into an indexing aperture 1402 to resist rotation and fix the pipe at a circumferential index. The pin may then be removed, and the pipe may be fixed at a different circumferential index by reinserting the pin into a different indexing aperture 1402. In this manner, the circumferential orientation of a louver perforation may be set, and the circumferential spacing of longitudinal rows of louver perforations may be set.

Figure 15:
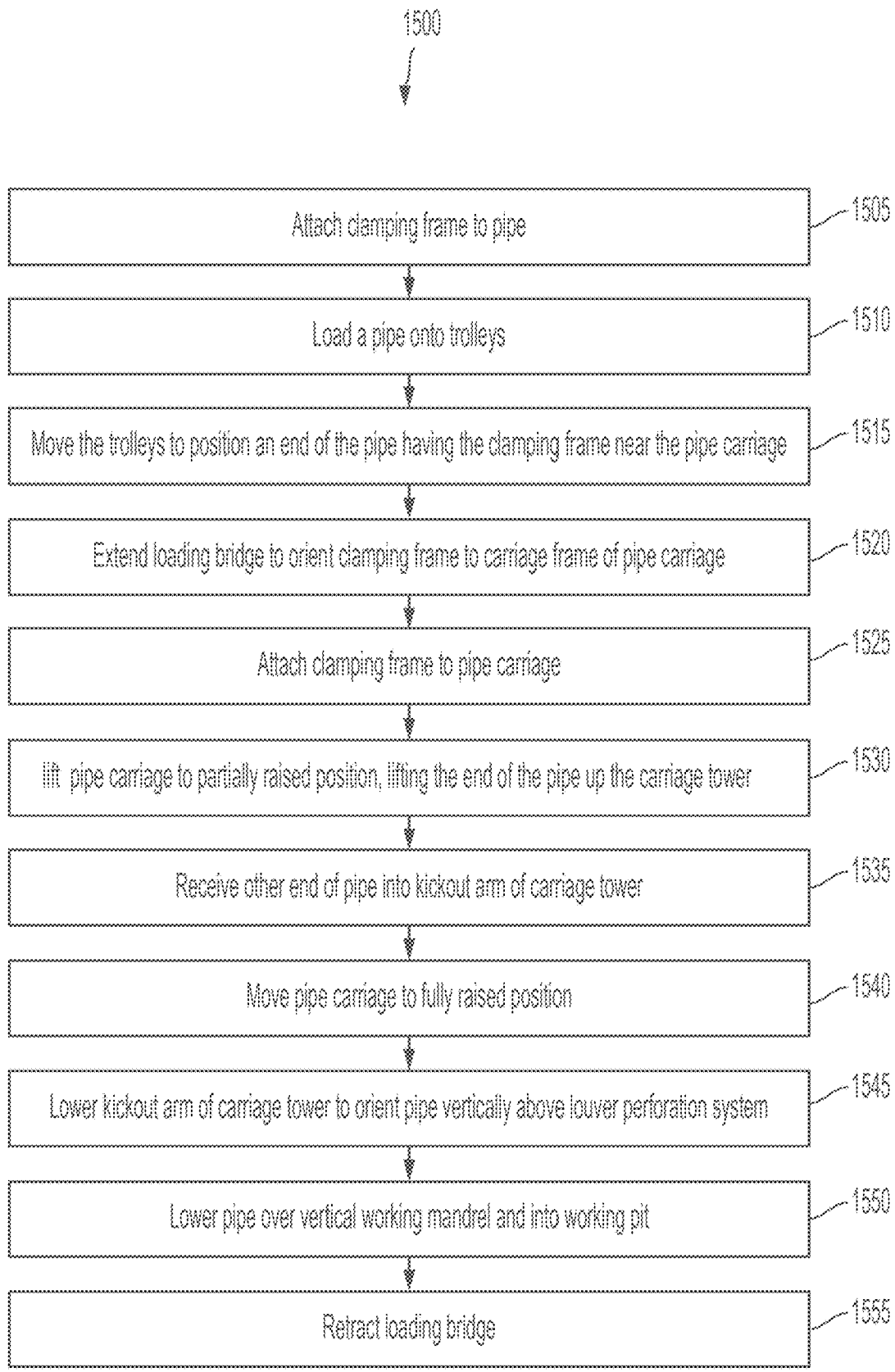
FIG. 15 depicts a method of transporting a pipe for processing, in accordance with various embodiments.

Having discussed various features of the pipe transportation system 1100 (FIG. 11), attention is now directed to FIG. 15 for a discussion of a method of transporting a pipe for processing. As used herein, processing may correspond to louver perforation, though other types of processing may be contemplated.

The method of transporting the pipe for processing 1500 may include various aspects. A clamping frame may be attached to a pipe (block 1505). The pipe may be loaded onto trolleys (block 1510). The trolleys may be moved to position an end of the pipe with the clamping frame near to a movable pipe carriage (block 1515). A loading bridge may be extended to orient the clamping frame to a carriage frame of the movable pipe carriage (block 1520). For instance, the loading bridge may lift the pipe to put the clamping frame in a desired orientation to facilitate joining to the movable pipe carriage. The loading bridge may provide a sliding surface for the pipe to be slidably moved to the desired orientation to facilitate joining to the movable pipe carriage. The clamping frame may be attached to the movable pipe carriage (block 1525). The movable pipe carriage may then be raised to an at least partially raised position, lifting the end of the pipe having the clamping frame up the carriage tower (block 1530). An opposite end of the pipe may be received into a kickout arm of the carriage tower (block 1535). The movable pipe carriage may be further moved to a fully raised position (block 1540) and the kickout arm of the carriage tower may be lowered to orient the pipe vertically above a louver perforation system (block 1545). The pipe may be lowered over a vertical working mandrel by lowering of the movable pipe carriage and into a working pit (block 1550). The loading bridge may be retracted (block 1555) and the pipe may be processed by the louver perforation system.

Figure 16:
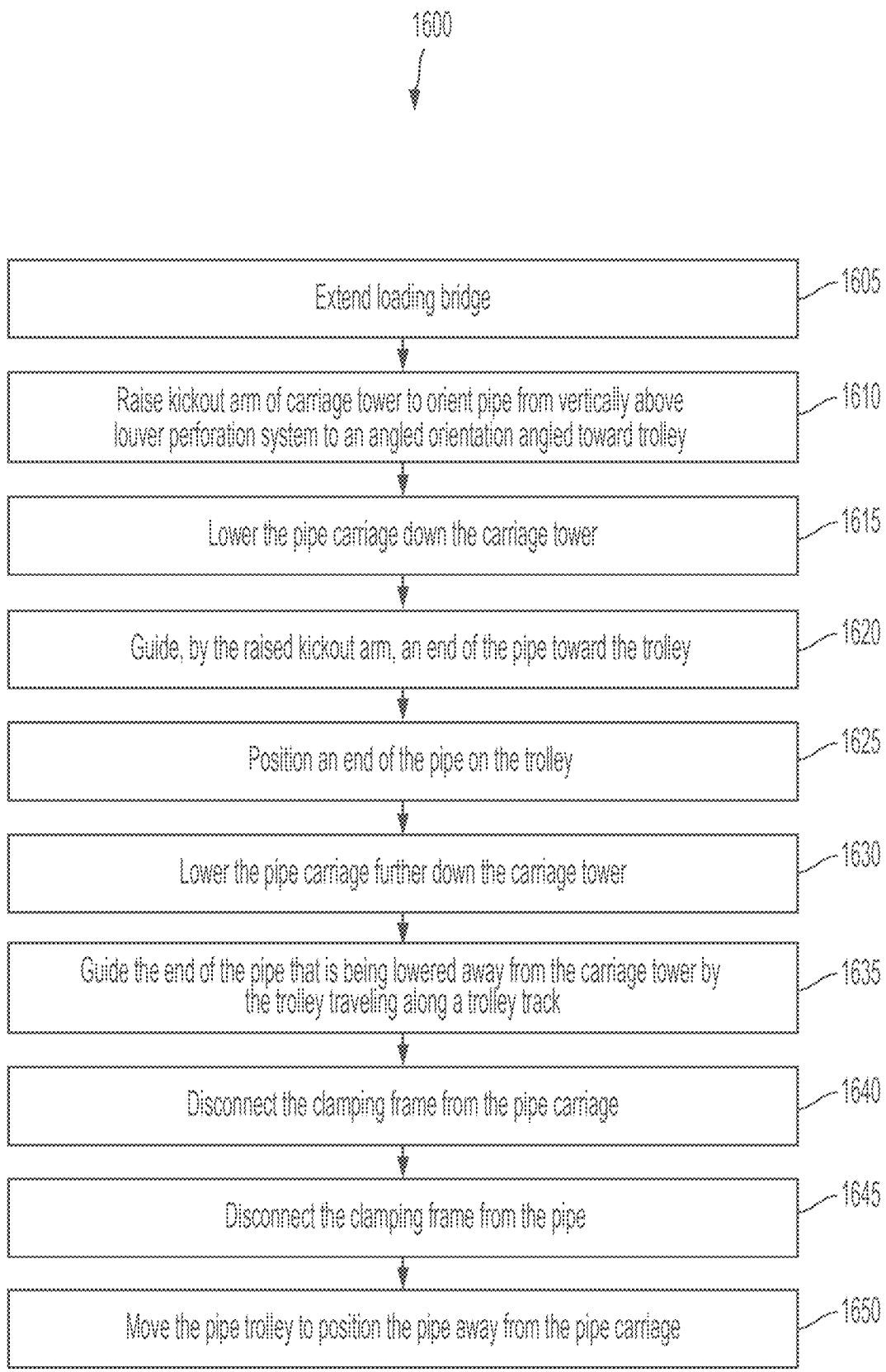
FIG. 16 depicts a method of transporting a pipe following processing, in accordance with various embodiments.

A method may also be provided for transporting away a pipe that has already been processed. For instance, with reference to FIG. 16, a method of transporting a pipe following processing 1600 may include following aspects. A method may include extending a loading bridge (block 1605) to provide a supporting surface away from aspects of the louver perforation system such as the vertical working mandrel. The method may include raising a kickout arm of a carriage tower to orient the pipe from vertically above aspects of the louver perforation system (such as the vertical working mandrel) to an angled orientation angled toward a pipe trolley (block 1610). The method may include lowering a movable pipe carriage down a carriage tower to lower the pipe (block 1615). The method may include guiding, by the raised kickout arm, an end of the pipe toward the pipe trolley (block 1620). The method may include positioning the end of the pipe on the pipe trolley (block 1625) and further lowering the movable pipe carriage further down the carriage tower (block 1630). The method may continue with guiding the end of the pipe that is being lowered away from the carriage tower by the pipe trolley traveling along a trolley track (block 1635). A clamping frame that connects the pipe to the movable pipe carriage may be disconnected from the movable pipe carriage (block 1640). The clamping frame may also be disconnected from the pipe (block 1645). The pipe trolley may be moved to position the pipe away from the movable pipe carriage (block 1650).

Quality Control System

A louver perforation system may interoperate with another other system during operation. For instance, a quality control system may be provided to inspect louver perforations being formed in spaced apart relation along the pipe and may measure louver perforations to identify any louver perforations with undesired characteristics. In this manner, not only may quality control be performed on louver perforations, but also machine malfunctions, failures, or maintenance requirements associated with the louver perforation system may be identified. Moreover, the quality control system may operate in parallel with the louver perforation system and the pipe transportation system so that as the pipe transportation system moves the pipe through the louver perforation system and as louvers are perforated, the quality control system is able to identify errors before an entire pipe is processed. This improves throughput and efficiency and reduces waste associated with pipes having out-of-specification louver perforations.

With reference to FIGS. 17A-B, a quality control system 1700 is provided. A quality control system may include one or more 3D camera 1706. The one or more 3D camera 1706 may be oriented to take photographs and/or videos of louver perforations perforated in a pipe by the louver perforation system. In various instances, the one or more 3D camera 1706 is positioned to capture images or videos of louvers shortly following perforation. For instance, the one or more 3D camera 1706 may be elevated above the perforator heads (see FIG. 4, 404-1, 404-2) a distance corresponding to about 5 louver perforations, or a distance corresponding to about 10 louver perforations, or a distance corresponding to above 15 louver perforations, or any distance between 1 and 15 louver perforations or otherwise as desired (e.g., "near a perforator head"). In various instances, a 3D camera 1706 is positioned near the first perforator head 404-1 (FIG. 4) and another 3D camera 1706 is positioned near the second perforator head 404-2 (FIG. 4).

The quality control system 1700 may include one or more robotic arm 1702. The robotic arm 1702 may comprise a movable structure configured to be oriented relative to a desired location and selectably fixed in place. For instance, each 3D camera 1706 may be supported at an end of a robotic arm 1702. In this manner, the 3D camera 1706 may be repositioned for different use scenarios, such as when louver perforations are being formed with larger or smaller size or in larger or smaller pipes.

The quality control system 1700 may include one or more shield 1704. In various instances a shield 1704 may be associated with each 3D camera 1706. The shield 1704 may be co-located at an end of the robotic arm 1702 with the 3D camera 1706 to regulate exposure of the 3D camera 1706 to light. In this manner, consistency and reliability of the imagery collected and actions taken in response to the collected imagery may be enhanced.

The quality control system 1700 may include one or more controller 1708. The controller 1708 may comprise a computer processor and memory that control the capture of images and/or videos by each 3D camera 1706, positioning of each robotic arm 1702, and processing of the captured images and videos to display human readable representations thereof, calculations based thereon, and the like. The controller 1708 may accept human input to define and characterize acceptable and unacceptable features of louver perforations as imaged or videoed by each 3D camera 1706.

The quality control system 1700 may include one or more display terminal 1710. The display terminal 1710 may generate human readable displays representing characteristics of the louver perforations such as their measurements or data related to their measurements. The display terminal 1710 may generate human readable images of the louver perforations. The display terminal 1710 may reflect data entered by the human operator so that the human operator may confirm the accuracy of such data entry.

Finally, the quality control system 1700 may include one or more input device 1712. The input device 1712 may comprise a keyboard, trackpad, touch screen, or other data entry mechanism whereby a human may control operation of the quality control system 1700. The input device 1712 may also be a memory storage device. Thus, reference to receiving data throughout methods elaborated herein may include accepting user input on a keyboard, accepting user input on a touch screen, and/or machine retrieval by the controller of data from an electronic memory.

Thus, in various embodiments, the quality control system 1700 includes a first robotic arm 1702 and a second robotic arm 1702, the first arm adjacent a first side of a pipe being perforated by a louver perforation system and the second arm adjacent a second side of a pipe being perforated by a louver perforation system. A first 3D camera 1706 is attached to the first robotic arm 1702 and a second 3D camera 1706 is attached to the second robotic arm 1702. The first 3D camera 1706 is positioned to view a first perforation in the pipe and the second 3D camera 1706 is positioned to view a second perforation in the pipe. A controller 1708 is configured to receive data from both 3D cameras 1706 and display on a display terminal 1710 at least one of an image, graph, or measurement corresponding to the data. Some of these example images, graphs, or measurements are depicted in FIGS. 18A-G. This data may include measurements of a size of a louver blade portion of a louver perforation. This data may include measurements of a size of an opening portion of a louver perforation. The data may include images of a louver perforation. The data may include averages and/or rolling averages of these measurements, or other measurements as desired.

Having discussed each aspect of the quality control system 1700, attention is directed to a sequence of screen displays depictable on the display terminal 1710 by the controller 1708. One will appreciate that this is an example embodiment, and other displays are contemplated. For instance, with reference to FIGS. 17 and 18A, a user may input data via an input device 1712 into fields of a window 1810 on the display terminal 1710 corresponding to aspects of a pipe. For instance, data may be input corresponding to a pipe length and a number of perforations to form along the pipe length. Data may be input corresponding to dimensions of the louver perforations to form. For instance, a user may input data corresponding to target dimensions of the louver perforation openings. For instance, a blade portion of a louver perforation (e.g., the raised portion spaced away from the pipe to form an opening in the pipe) may have a length from end to end. Similarly, the size of the opening that is formed between the raised portion and the pipe may have a particular size (e.g., a slot opening).

Figure 18A:
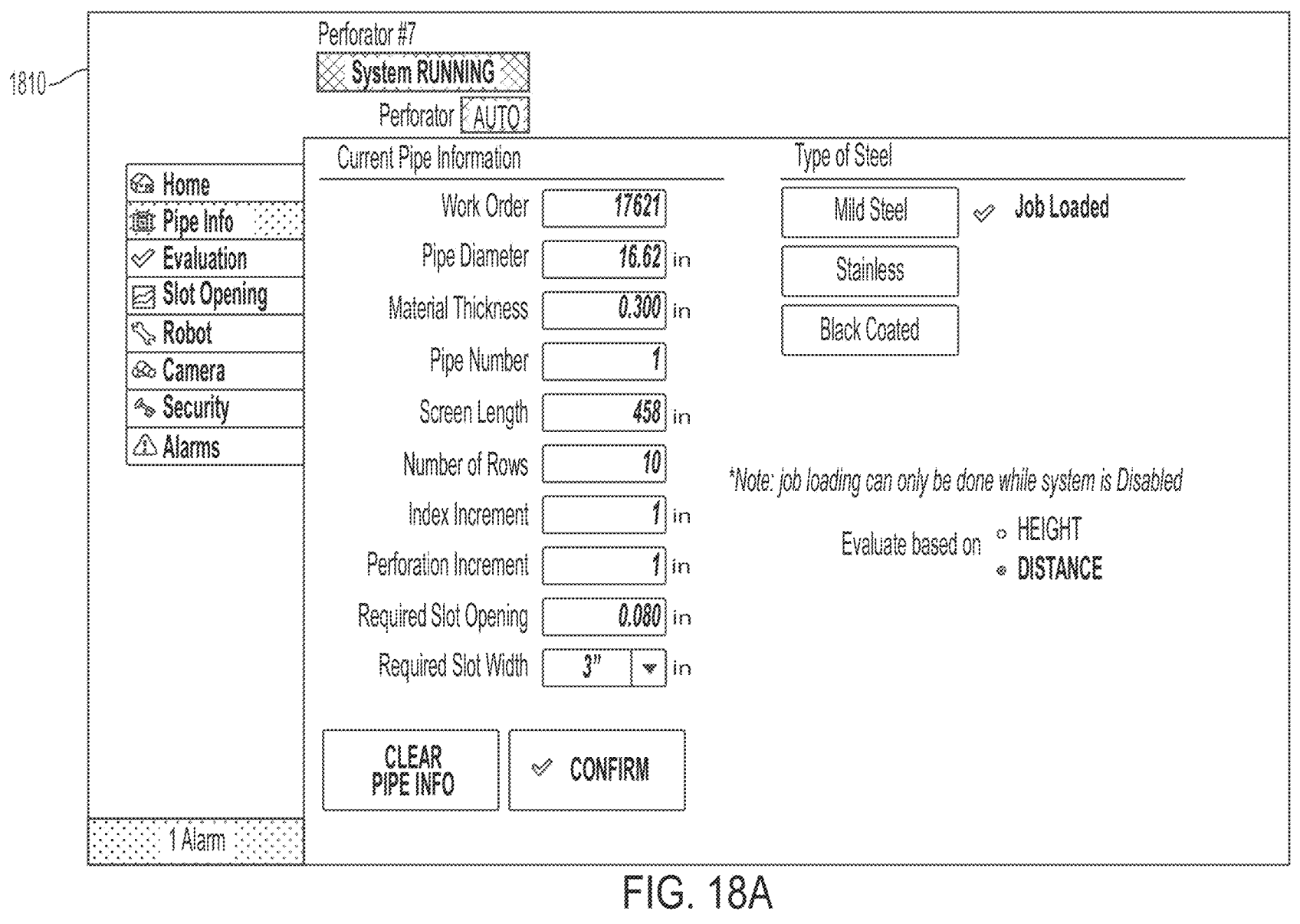
Figure 18B:
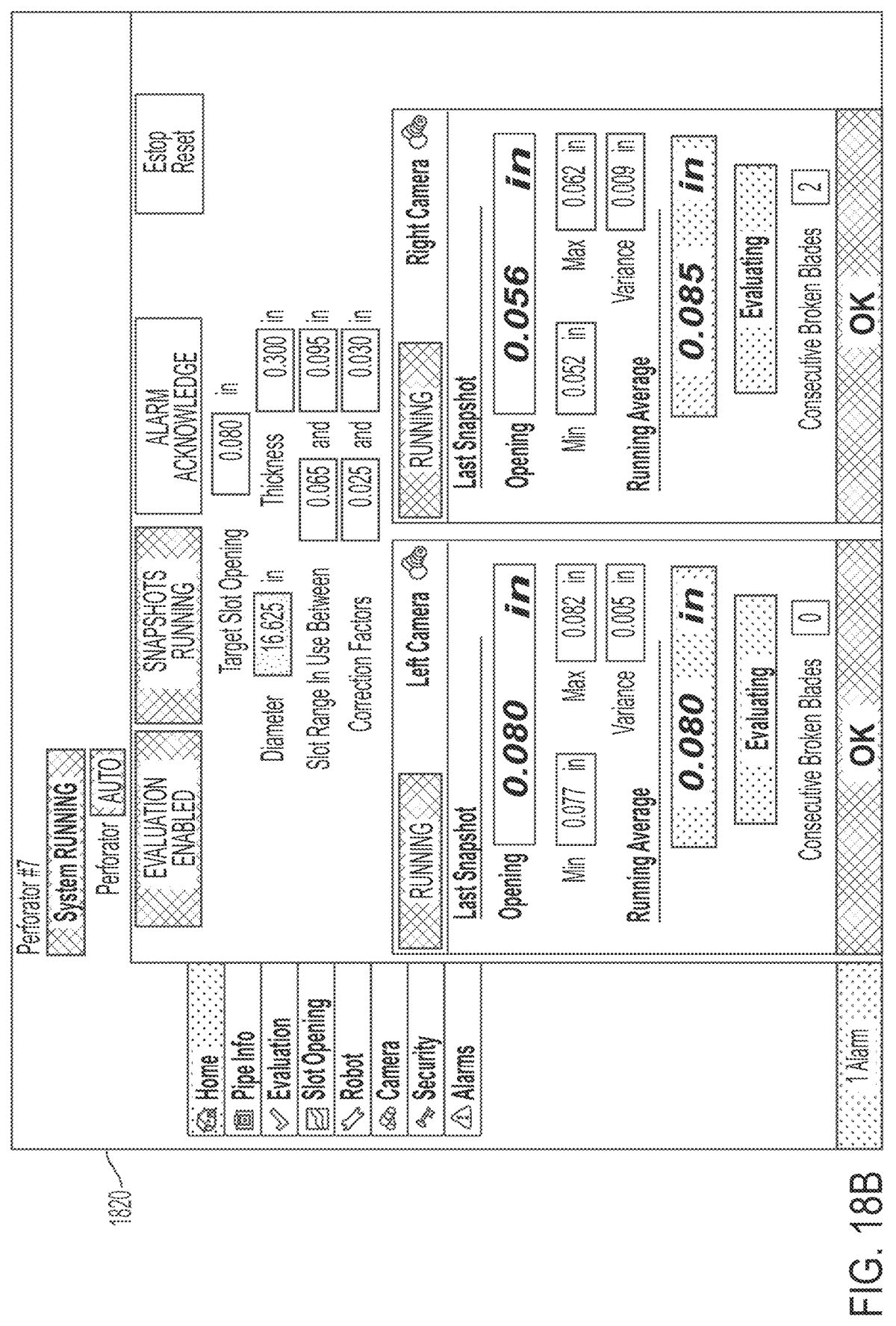

With additional reference to FIG. 18B, a user may input data via an input device 1712 into fields of a window 1820 on the display terminal 1710. This data may include tolerance data that corresponds to how far from a target value any measured feature of a louver perforation may differ and still be considered acceptable. In this manner, the user may establish quality control limitations, which then may be measured and monitored by the quality control system. For instance, an upper and lower blade size threshold may be entered corresponding to a louver blade portion of a perforation of the perforations to be formed along the pipe length. Furthermore, during operation, the window 1820 may show a running average of such values so that the user may monitor quality of the louver perforations being formed.

With additional reference to FIG. 18C, a user may input data via an input device 1712 into fields of a window 1830 on the display terminal 1710. This data may include a threshold for a maximum count of broken perforators to be detected prior to setting of an alarm or taking a responsive action. Moreover, data may be entered to define boundary conditions corresponding to a "broken" versus a not-broken perforation, as well as various correction factors and offsets to normalize the detected measurements.

Figure 18D:
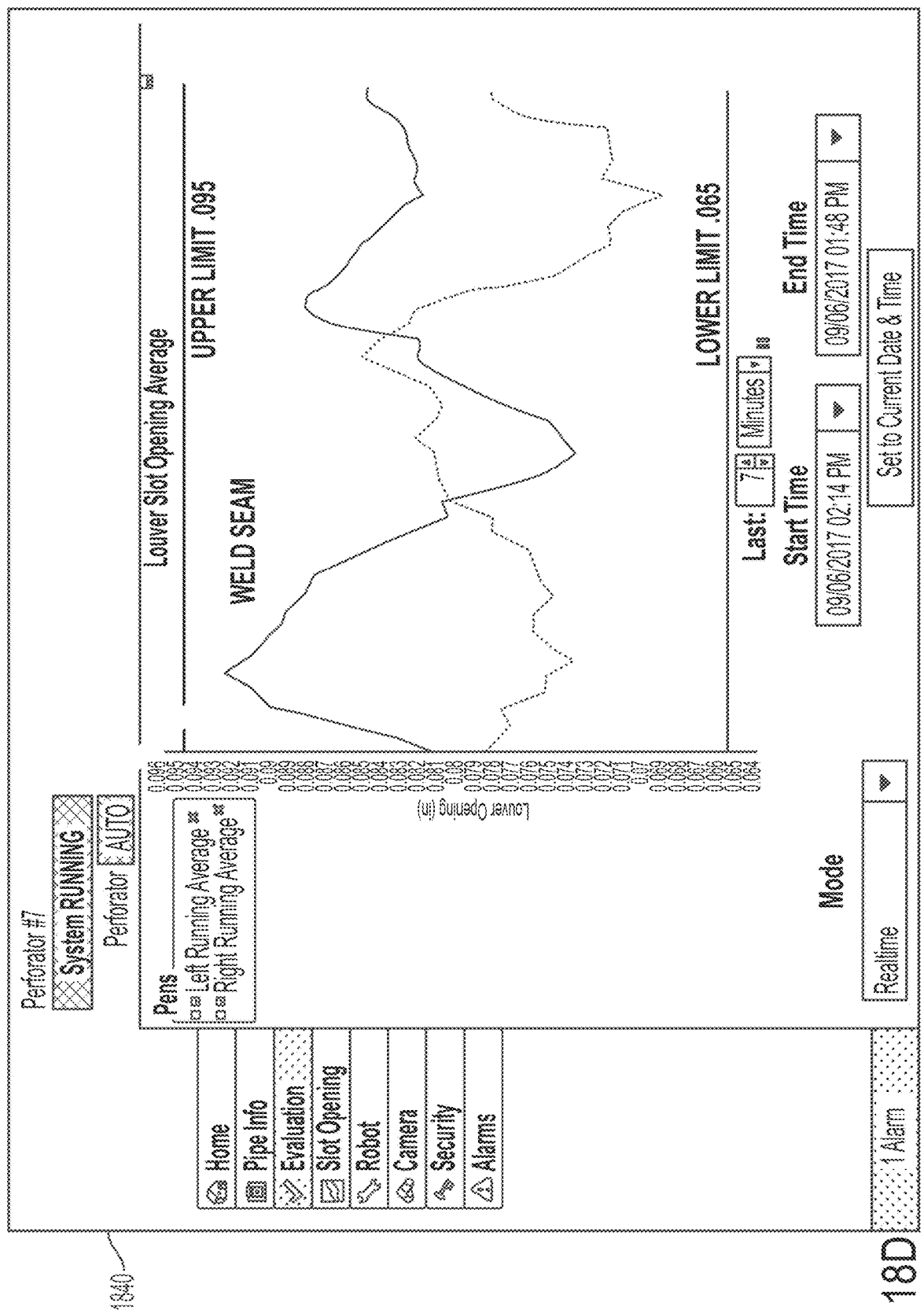

Directing attention now to FIGS. 17 and 18D, a user may monitor quality control output data output by the controller 1708 into fields of a window 1840 on the display terminal 1710. For instance, to facilitate human readability, graphs may be generated corresponding to features of a louver perforation measured over time and/or across multiple louver openings. For instance, a slot opening may be graphed to facilitate trend identification by a user.

Figure 18E:
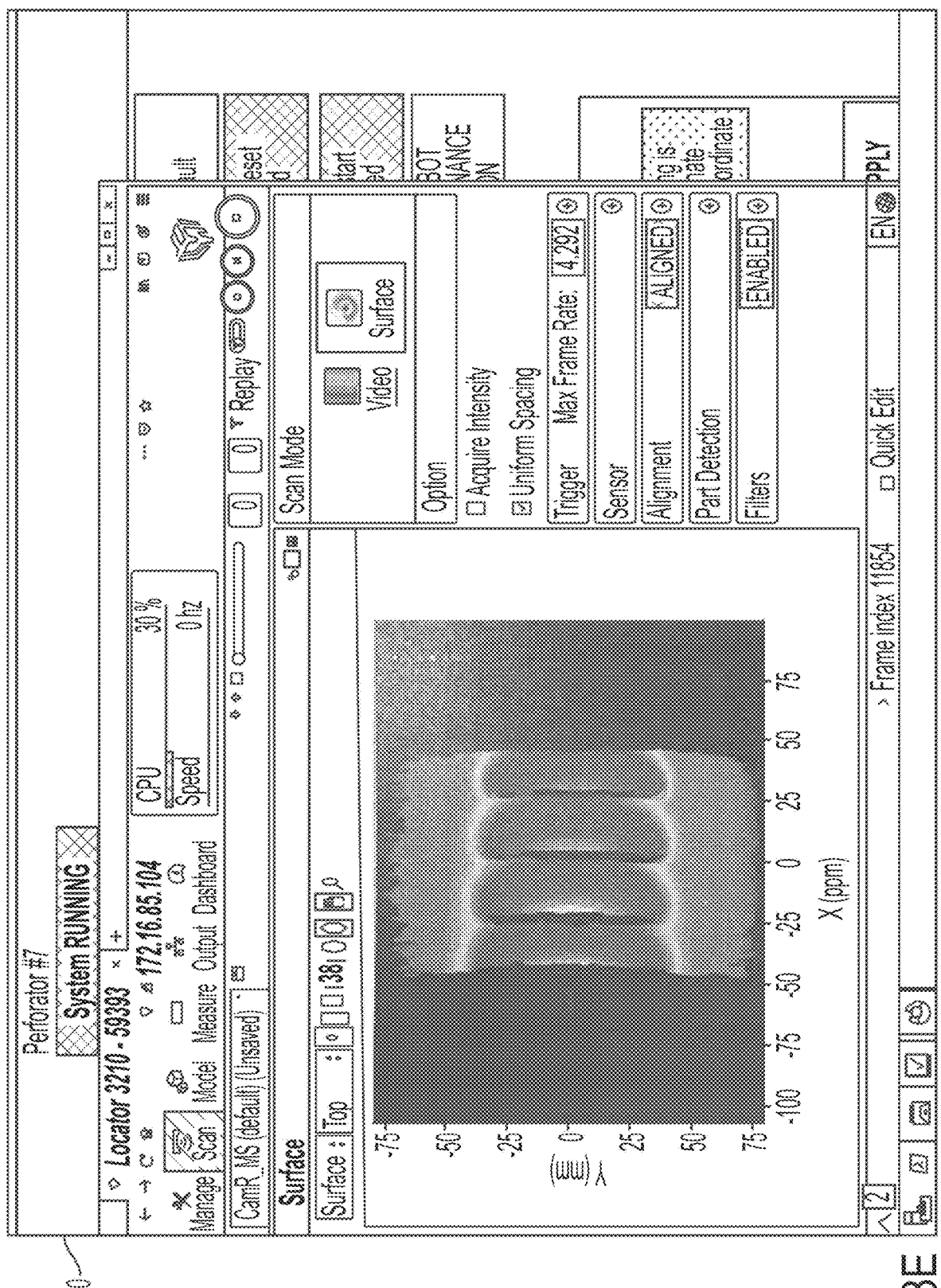
Figure 18F:
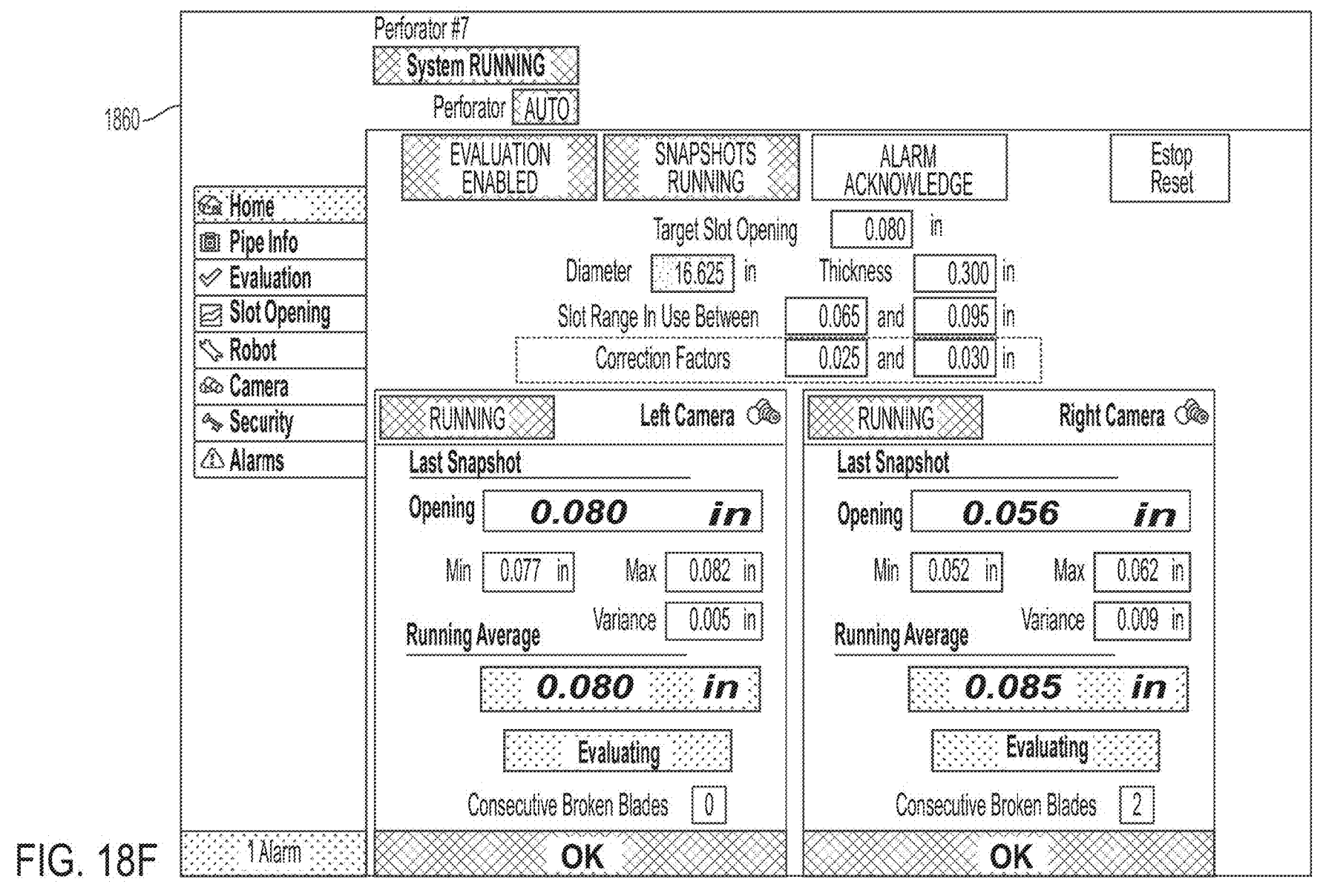

Directing attention now to FIGS. 17 and 18E, a user may monitor quality control output data output by the controller 1708 corresponding to images displayed in window 1850 on the display terminal 1710. For instance, images collected by a 3D camera 1706 may be displayed. Moreover, false color may be provided to correspond to a measurement. For instance, a color of an image may correspond to a distance measurement. In this manner, variations in a slot opening (such as that indicated by a measurement of a distance to a blade portion) or blade portion length may be readily perceived. To facilitate human readability, graphs may be generated corresponding to features of a louver perforation measured over time and/or across multiple louver openings. For instance, a slot opening may be graphed to facilitate trend identification by a user. Moreover, with momentary reference to FIG. 18F as well as FIG. 17A-B, one may recognize similarities to FIG. 18B but with additional emphasis placed on fields entitled "CORRECTION FACTORS." One may thus appreciate that a window 1860 (or window 1820 may depict both inputs from a user and outputs from a controller 1708 at a same time. For instance, window 1860 depicts data corresponding to measurements of one or more 3D camera 1706 and correction factors input by a user operating an input device 1712.

Figure 18G:
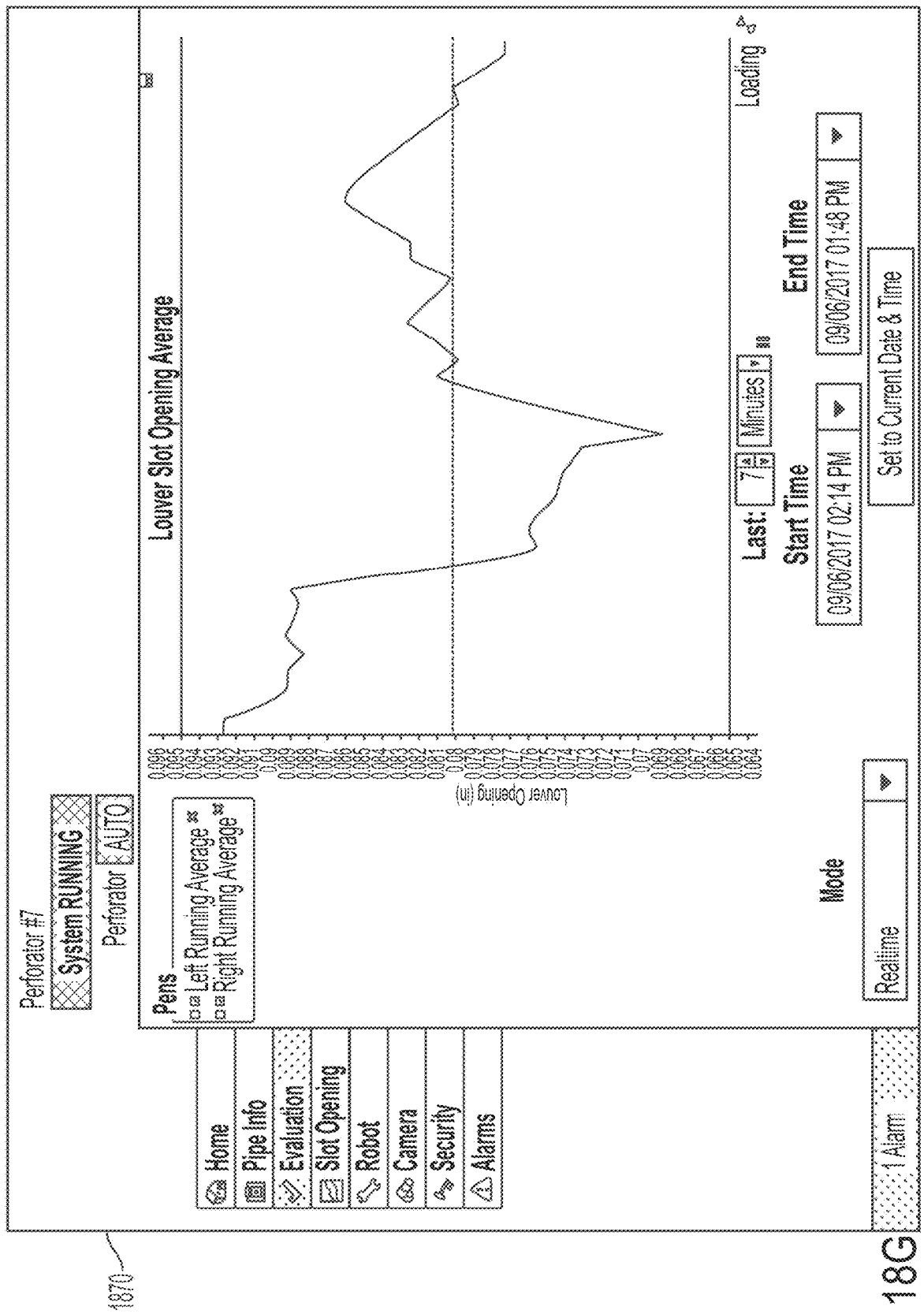

Finally, directing attention now to FIG. 17 and FIG. 18G, one may appreciate that a window 1870 may also permit users to identify operational errors of the quality control system itself. For example, a window 1870 depicts average slot opening dimensions collected over time. However, a straight horizontal line through the graph of average slot opening dimensions indicates that an associated 3D camera 1706 is not properly updating and may need maintenance.

Figure 19:
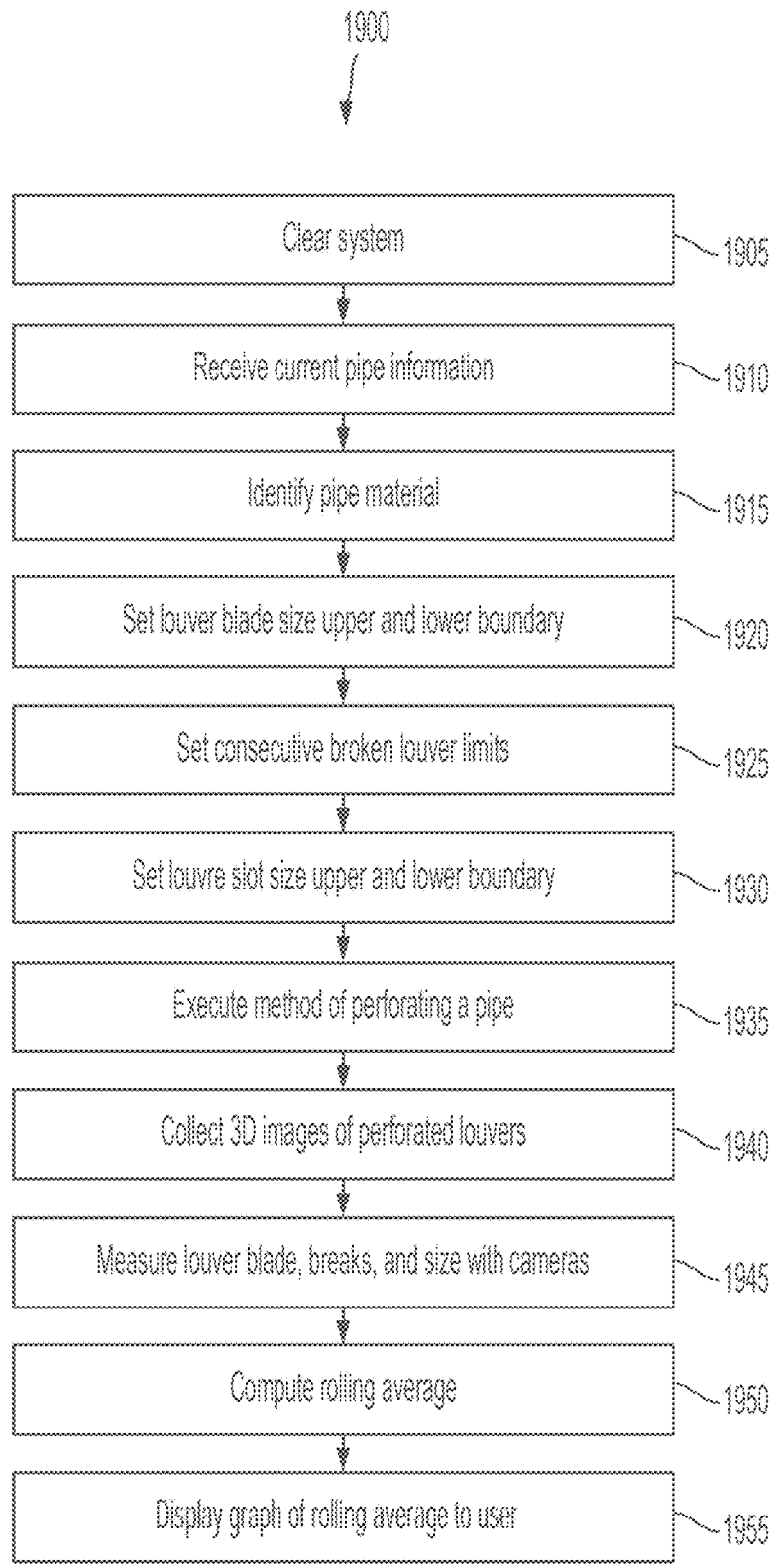
FIG. 19 depicts a method of automated quality control for pipe perforation, in accordance with various embodiments.

Shifting attention to FIG. 19, a method of quality control 1900 may be implemented by the aforementioned quality control system 1700. This method may include a variety of aspects, some of which correspond to depictions of the example windows discussed above. However, the discussed windows are examples, so other depictions may also be contemplated. The method may begin with a reset action to clear the system of prior data associated with prior sessions of forming louver perforations (block 1905). Subsequently, the system may receive current pipe information (block 1910). For instance, the method may include receiving data corresponding to a pipe length and a number of perforations to form along the pipe length. The method may also include identifying a pipe type (block 1915). For instance, the user may select a pipe material type for available types, each type associated with different material properties such as ductility, strength, etc. The method may include setting a louver blade size upper and lower boundary (block 1920). For instance, the method may include receiving data corresponding to an upper and lower blade size threshold corresponding to a louver blade portion of a perforation of the perforations to form along the pipe length.

In addition, the method may include setting consecutive broken louver limits (block 1925). This aspect may include receiving data corresponding to a maximum count of broken perforations of the perforations to form along the pipe length. The method may include setting louver slot size limits (block 1930). More specifically, this aspect may contemplate receiving data corresponding to an upper and lower opening size threshold corresponding to an opening portion of the perforation of the perforations to form along the pipe length.

In various instances the method includes aspects happening contemporaneously and aspects happening sequentially. In various instances, the method overlaps in time with a method of perforating a pipe by a louver perforation system, so that the quality control system operates during the perforation of the louvers (block 1935). As such, the method may be said to include forming, by a louver perforation system, a plurality of perforations along the pipe length.

The method includes collecting 3D images of perforated louvers (block 1940). For instances, a 3D camera may collect an image of the perforations of the plurality of perforations during the forming and/or after the forming.

The method may further include processing the image to measure, by a controller, aspects of the louver perforation such as the louver blade, louver breaks, louver size and the like (block 1945). For instance, this aspect may include the controller processing the image to measure a blade size of the louver blade portion, processing the image to measure an opening size of the opening portion of the perforation, and/or determining whether the louver blade portion of the perforation is broken and updating a count of broken perforations in response to the determining. The method may include computing rolling averages (block 1950), for instance computing a rolling average of at least one of the blade size and the opening size. The method may include displaying a graph of rolling averages to a user (block 1955).

In various instances, automated control of the louver perforation system by the quality control system is further contemplated. For instance, the controller may send an automated message to aspects of the louver perforation system to terminate processes in response to a detection of inadequate quality. For instance, the controller may send an instruction by the controller to the louver perforation system to terminate the forming of the plurality of perforations along the pipe length in response to the blade size of the louver blade portion exceeding at least one of the upper and lower blade size thresholds. The controller may send an instruction to the louver perforation system to terminate the forming of the plurality of perforations along the pipe length in response to the count of broken perforations exceeding the maximum count of broken perforations. The controller may reset the maximum count of broken perforations to zero in response to detecting wherein the louver blade portion of the perforation is not broken.

The controller may send an instruction to the louver perforation system to terminate the forming of the plurality of perforations along the pipe length in response to the opening size of the opening portion exceeding at least one of the upper and lower opening size thresholds. The controller may send an instruction to the louver perforation system to terminate the forming of the plurality of perforations along the pipe length in response to the rolling average of the blade size of the louver blade portion exceeding at least one of the upper and lower blade size thresholds. The controller may send an instruction to the louver perforation system to terminate the forming of the plurality of perforations along the pipe length in response to the rolling average of the opening size of the opening portion exceeding at least one of the upper and lower opening size thresholds.

Figure 20:
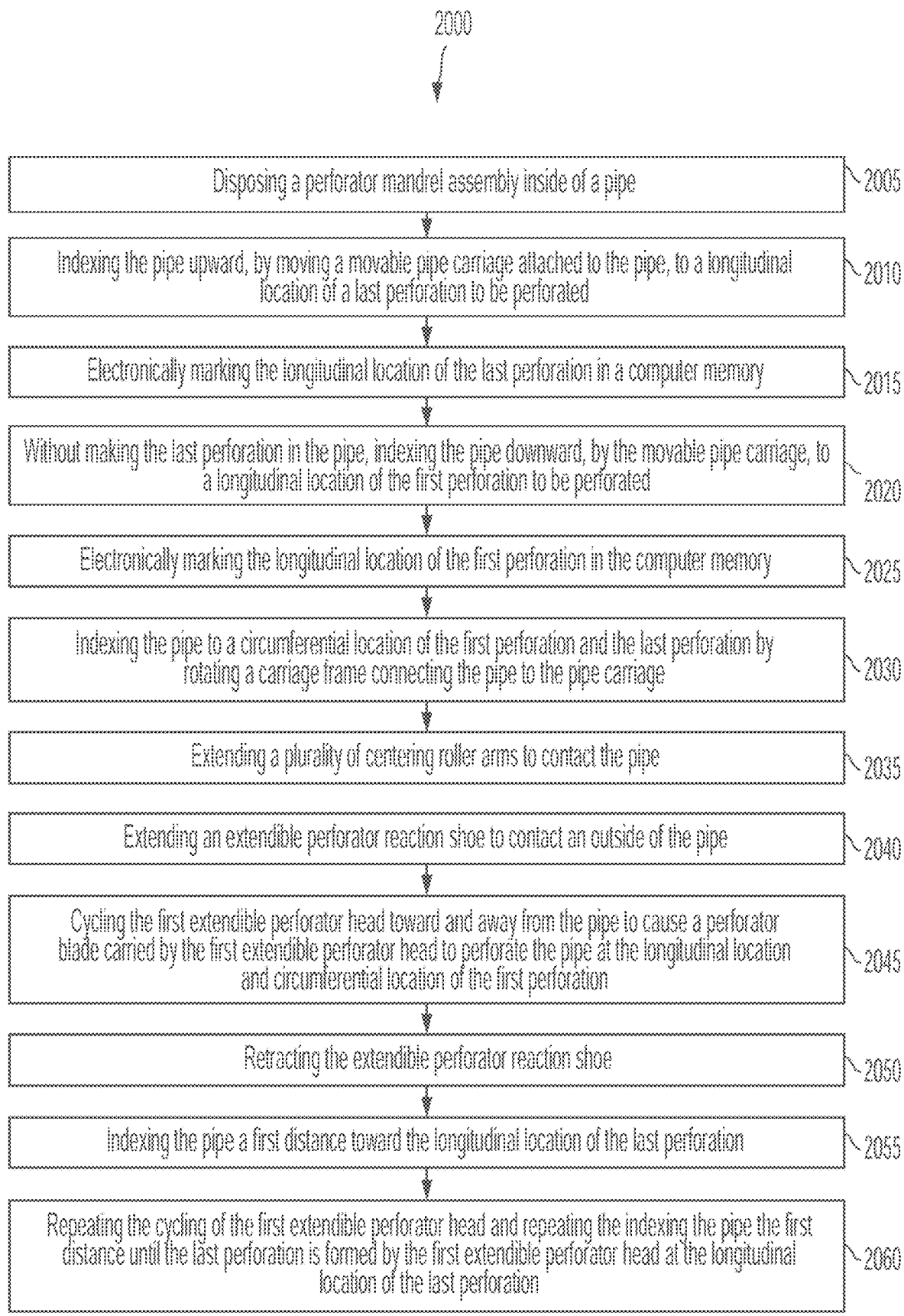
FIG. 20 depicts a method of louver perforation, in accordance with various embodiments.

Having introduced aspects of a louver perforation system, a pipe transportation system, and a quality control system, global reference to all of FIGS. 1-19 is now contemplated, in additional to reference to FIG. 20, for an example method of louver perforation 2000 that encompasses aspects of multiple of the described systems. For instance, a method may include disposing a perforator mandrel assembly 104 inside of a pipe (block 2005). The perforator mandrel assembly 104 may have a first extendible perforator head 404-1 supported by a vertical working mandrel 201 and inside of the pipe. The method may contemplate indexing the pipe upward by moving a movable pipe carriage 1110 attached to the pipe, to a longitudinal location of a last perforation to be perforated (block 2010). The movement may be to a location wherein the first extendible perforator head 404-1 is aligned with the longitudinal location of the last perforation to be perforated. The method may include electronically marking the longitudinal location of the last perforation in a computer memory of a controller 1708 (block 2015).

Without making the last perforation in the pipe, subsequently the method may include indexing the pipe downward, by the movable pipe carriage 1110, to a longitudinal location of a first perforation to be perforated, wherein the first extendible perforator head 404-1 is aligned with the longitudinal location of the first perforation to be perforated (block 2020). The method may continue with electronically marking the longitudinal location of the first perforation in the computer memory of the controller 1708 (block 2025).

Having marked the first and last perforations, the movable pipe carriage 1110 may now move to index the pipe to a circumferential location of the first perforation and the last perforation by rotating a carriage frame connecting the pipe to the movable pipe carriage (block 2030). A plurality of centering roller arms 408-1, 408-2, 408-3, and 408-4 may be extended to contact the pipe (block 2035). An extendible perforator reaction shoe may be extended to contact an outside of the pipe (block 2040).

The first extendible perforation head 404-1 is cycled toward and away from the pipe to cause a first perforator blade 412-1 carried by the first extendible perforator head 404-1 to perforate the pipe at the longitudinal location and circumferential location of the first perforation (block 2045). The extendible perforator reaction shoe 410-1 is retracted (block 2050) and the pipe is indexed a first distance toward the longitudinal location of the last perforation (block 2055).

Subsequently, the cycling of the first extendible perforator head is repeated and the indexing the pipe the first distance is repeated until the last perforation is formed by the first extendible perforator head at the longitudinal location of the last perforation (block 2060). For brevity, similar corresponding aspects with respect to the second extendible perforator head are not elaborated, though one may appreciate that both a first extendible perforator head and second extendible perforator head may be implemented to facilitate more rapid processing of pipes to be perforated.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A louver perforation system for forming a plurality of raised portions extending away from a pipe to create a plurality of downward facing slots in the pipe, the pipe being oriented in a vertical direction, the system comprising:
   a mandrel configured to be disposed inside the pipe;
   a first perforator head supported by the mandrel and configured to be disposed inside the pipe and be extended towards the pipe;
   a first perforator blade attached to the first perforator head that causes the first perforator blade to penetrate the pipe to form the plurality of raised portions adjacent to one another along a length of the pipe; and
   a reaction table adjacent to the mandrel and including a first perforator reaction shoe positioned outside the pipe to support the pipe in a fixed position during the penetrating through the pipe by the first perforator blade to create the plurality of downward facing slots in the pipe a movable pipe carriage having a carriage frame that is configured to travel up and down a carriage tower; and
   a clamping frame attachable to the pipe and attachable to the carriage frame, wherein the clamping frame has a series of indexing apertures configured to receive a pin to orient the pipe in a series of rotational orientations relative to the first perforator blade.

2. The louver perforation system of claim 1, wherein the first perforator reaction shoe includes a reaction shoe blade.

3. The louver perforation system of claim 2, wherein the first perforator blade and the first perforator reaction shoe are positioned adjacent to one another such that the first perforator reaction shoe outside the pipe is used to support the first perforator blade inside the pipe during the penetration through the pipe.

4. The louver perforation system of claim 2, wherein the reaction shoe blade has a concave arcuate reaction face corresponding in shape to the pipe and for stabilizing the pipe during the penetrating the pipe by the first perforator blade so that no material is removed from the pipe by the penetrating through the pipe by the first perforator blade.

5. The louver perforation system of claim 1, further comprising a plurality of centering roller arms selectably extendible from the reaction table to the pipe, wherein each centering roller arm comprises an arm with a pair of wheels contactable to the pipe to support the pipe.

6. The louver perforation system of claim 1, wherein the mandrel is vertical, and
   the first extendible perforator head is extendible in a horizontal plane perpendicular to the mandrel, whereby the pipe is at least partially stabilized by gravity.

7. The louver perforation system of claim 1, wherein the mandrel includes a pipe alignment flange that is a disc disposed at an end of the mandrel and inside the pipe to at least one of align the pipe and ameliorate crushing of the pipe.

8. The louver perforation system of claim 1 further comprising:
   a second extendible perforator head supported by the mandrel and configured to be disposed inside of the pipe;
   a second perforator blade attached to the second extendible perforator head to penetrate through the pipe as the first extendible perforator head extends from the mandrel in a second direction opposite of and colinear with the first direction; and
   the reaction table also including a second extendible perforator reaction shoe outside the pipe to support the pipe during the penetrating through the pipe by the second perforator blade.

9. The louver perforation system of claim 1, wherein the mandrel extends vertically upward from a subterranean pit and toward the reaction table.

10. The louver perforation system of claim 1, wherein a pipe transportation system connects to the pipe to selectably raise the pipe from a pit and passing over the mandrel, whereby the first perforator blade attached to the first extendible perforator head is configured to form penetrations through the pipe at multiple positions along at least a portion of a length of the pipe.

11. The louver perforation system of claim 1, wherein the first perforator blade includes:
   a shearing face having an edge to contact and shear through the pipe, and a ramping face connected at an angle to the edge of the shearing face and providing a surface to bend the pipe forming a louver without removing material from the pipe.

12. The louver perforation system of claim 11, wherein the first perforator blade further includes:
- a shearing corner having a curved edge to contact and shear through the pipe, the shearing corner adjacent the shearing face; and
- a ramping corner, having a curved face connected at an angle to the curved edge of the shearing corner and providing a surface to bend the pipe forming the louver without further tearing of the pipe that has been sheared by the shearing face and the shearing corner.

13. The louver perforation system of claim 1, wherein the movable pipe carriage further includes a pipe spindle extending from the clamping frame and rotatably connected to the carriage frame so that the pipe attachable to the clamping frame is rotatable relative to the mandrel.

* * * * *